(12) United States Patent
Minemura

(10) Patent No.: US 7,652,838 B2
(45) Date of Patent: Jan. 26, 2010

(54) LIBRARY DEVICE

(75) Inventor: Tsukasa Minemura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 73 days.

(21) Appl. No.: 11/905,100

(22) Filed: Sep. 27, 2007

(65) Prior Publication Data

US 2008/0024901 A1 Jan. 31, 2008

Related U.S. Application Data

(63) Continuation of application No. PCT/JP2005/006161, filed on Mar. 30, 2005.

(51) Int. Cl.
*G11B 19/02* (2006.01)
(52) U.S. Cl. .......................... 360/69; 360/71
(58) Field of Classification Search ........................ None
See application file for complete search history.

(56) References Cited

U.S. PATENT DOCUMENTS 5,867,003 A * 2/1999 Hashimoto et al. ...... 318/568.11
5,946,160 A * 8/1999 Ohashi ........................ 360/92.1
6,064,544 A * 5/2000 Wada ........................ 360/92.1
7,106,538 B2 9/2006 Minemura et al.

FOREIGN PATENT DOCUMENTS

| JP | 55-1157156 | 12/1980 |
| JP | 05-036177 | 2/1993 |
| JP | 07-085562 | 3/1995 |
| JP | 2006-40450 | 2/2006 |

OTHER PUBLICATIONS

Preliminary International Search Report in corresponding PCT Application PCt/JP2005/006161 Dated Jul. 5, 2005.

* cited by examiner

*Primary Examiner*—Jason C Olson
(74) *Attorney, Agent, or Firm*—Staas & Halsey LLP

(57) ABSTRACT

A feeding mechanism includes a first feeding mechanism and a second feeding mechanism that operates during non-operation of the first feeding mechanism. A movement control unit that performs a control of moving the feeding mechanism towards a housing cabinet. A swivel mechanical unit swivels an inclination angle of the feeding mechanism to a predetermined angle along with an operation by the movement control unit. A movement stopping unit stops a movement of the feeding mechanism based on the inclination angle of the feeding mechanism.

6 Claims, 24 Drawing Sheets

LIBRARY DEVICE

This application is a continuing application, filed under 35 U.S.C. §111 (a), of International Application PCT/JP2005/006161, filed March 30, 2005, the contents of which are incorporated herein by reference.

BACKGROUND OF THE INVENTION

1. Field of the Invention

The present invention relates to a library device that performs recording/reproduction of data by automatically feeding a recording medium such as a magnetic tape to a recording/reproducing device (drive), and more particularly to a library device that can enhance stop precision by using a feeding mechanism that feeds the recording medium to a housing cabinet.

2. Description of the Related Art

Recently, due to a large amount of data in a computer system or for searching data such as multimedia, graphic data etc. that necessitates a large storage capacity, a library device that includes a recording cartridge type-recording medium that records data is increasingly necessitated. The library device includes a function that automatically attaches a magnetic tape cartridge to a cell, removes the magnetic tape cartridge from the cell, and performs storage, recording/reproduction of data etc. in the magnetic tape cartridge.

To be specific, the library device internally includes a medium-handling robot (a feeding mechanism) called accessor. The accessor automatically performs insertion of the recording medium in a medium housing cabinet (cell) and removal of the recording medium from the medium housing cabinet. Similarly, the accessor automatically performs mounting of the recording medium on the medium housing cabinet and a recording/reproducing device (Magnetic Tape Unit (MTU)/drive) and demounting of the recording medium from the medium housing cabinet and the recording/reproducing device. Further, the library device is communicably connected to a host computer. Based on an instruction from the host computer, the library device automatically performs storage, recording/reproduction of data etc. on the magnetic tape cartridge.

A technology is disclosed (for example, see Japanese Patent Application Laid-open No. H7-85562) which relates to the library device that feeds the recording medium such as the magnetic tape cartridge to a predetermined position in the housing cabinet and performs recording/reproduction of data using the recording/reproducing device. Further, the present inventor has prior predicted occurrence of a failure in the feeding mechanism and has disclosed a technology in which an auxiliary feeding mechanism is included separately from a main feeding mechanism and the auxiliary feeding mechanism is used to feed the recording medium when a failure occurs in the main feeding mechanism (see Japanese Patent Application No. 2004-220813).

However, the commonly used library device mentioned earlier includes the following drawbacks. In other words, in the commonly used library device, due to life span of a feeding motor or occurrence of a failure in the feeding motor that actually moves the feeding mechanism, a stop precision of the feeding mechanism worsens and a large scale failure is likely to result in the feeding mechanism being overdriven, thereby damaging the recording medium that is being fed or that is housed. Further, when using the library device that includes the main feeding mechanism and the auxiliary feeding mechanism, mounting efficiency of the recording medium is enhanced, thereby resulting in occurrence of a plurality of movable stop positions and further necessitating the stop precision at the movable stop positions.

The drawbacks mentioned earlier are explained based on an overview of the commonly used feeding mechanism. FIG. 31 is a perspective view of the commonly used feeding mechanism. In other words, as shown in FIG. 31, a feeding mechanism 50 includes a swivel mechanical unit 51, a tilt mechanism 52, a Z-axis mechanical unit 53, a hand mechanical unit 54, and holding pawls 55. The swivel mechanical unit 51 controls a direction of the feeding mechanism 50 at a predetermined inclination angle. The tilt mechanism 52 controls a movement of the feeding mechanism 50 in a vertical direction. The Z-axis mechanical unit 53 controls a movement direction of the feeding mechanism 50. The hand mechanical unit 54 uses the holding pawls 55 to hold the magnetic tape cartridge. Further, if the feeding mechanism 50 is overdriven, a stopper member 56 stops the movement of the feeding mechanism 50.

In other words, in the feeding mechanism 50 that is commonly used, a range of movement (stroke) in a movement stroke of the feeding mechanism 50 differs according to the inclination angle of the feeding mechanism 50. Further, when moving the feeding mechanism 50, a clearance between the feeding mechanism 50 and magnetic-tape housing cabinets 220 (shown in FIG. 3) is negligible. Due to this, the recording medium, which is being fed by the feeding mechanism 50 or is stored in the housing cabinets 220, is likely to be damaged.

To be specific, when a direction of the feeding mechanism 50 is 90 degrees (or −90 degrees in the opposite direction) and the feeding mechanism 50 moves (accesses) towards the housing cabinets 220 that are positioned either to the left or to the right, the movement stroke of the feeding mechanism 50 is approximately 103 millimeters (mm). Thus, the clearance between the feeding mechanism 50 and the housing cabinets 220 is negligible (approximately 11.5 mm).

Due to this, if a failure occurs during the movement of the feeding mechanism 50, the feeding mechanism 50 and the housing cabinets 220 are likely to come closer and touch each other. Moreover, when accessing a cabinet that is positioned at a top portion of a recording/reproducing device 230 in the direction of the recording/reproducing device 230 (a position of the feeding mechanism 50 is 0 degree), the movement stroke of the feeding mechanism 50 is approximately 113.4 mm. Thus, the clearance between the feeding mechanism 50 and the cabinets that are positioned either to the left or to the right is negligible (approximately 10 mm). Thus, the recording medium is likely to be damaged due to touching of the feeding mechanism 50 and the housing cabinets 220.

SUMMARY OF THE INVENTION

It is an object of the present invention to at least partially solve the problem in the conventional technology.

A library device according to one aspect of the present invention includes a housing cabinet that houses a plurality of recording media in a plurality of cells; a recording/reproducing device that performs recording/reproduction of data on a recording medium; a feeding mechanism that feeds the recording medium to a predetermined position of the housing cabinet, the feeding mechanism including a first feeding mechanism and a second feeding mechanism, the second feeding mechanism operating during non-operation of the first feeding mechanism; a movement control unit that performs a control of moving the feeding mechanism towards the housing cabinet; a swivel mechanical unit that swivels an inclination angle of the feeding mechanism to a predetermined angle along with an operation by the movement control unit; and a movement stopping unit that stops a movement of the feeding mechanism by the movement control unit. The movement stopping unit stops the movement of the feeding mechanism based on the inclination angle of the feeding mechanism.

A library device according to another aspect of the present invention includes a housing cabinet that houses a plurality of recording media in a plurality of cells; a recording/reproducing device that performs recording/reproduction of data on a recording medium; a feeding mechanism that feeds the recording medium to a predetermined position of the housing cabinet; a movement control unit that performs a control of moving the feeding mechanism towards the housing cabinet; a swivel mechanical unit that swivels an inclination angle of the feeding mechanism to a predetermined angle along with an operation by the movement control unit; and a movement stopping unit that stops a movement of the feeding mechanism by the movement control unit. The movement stopping unit stops the movement of the feeding mechanism based on the inclination angle of the feeding mechanism.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a library device according to the present invention are explained in detail below with reference to the accompanying drawings. An overview and a salient feature of a library device according to an embodiment of the present invention are explained first and a structure and a function of each member of the library device are explained next in detail.

Figure 1:
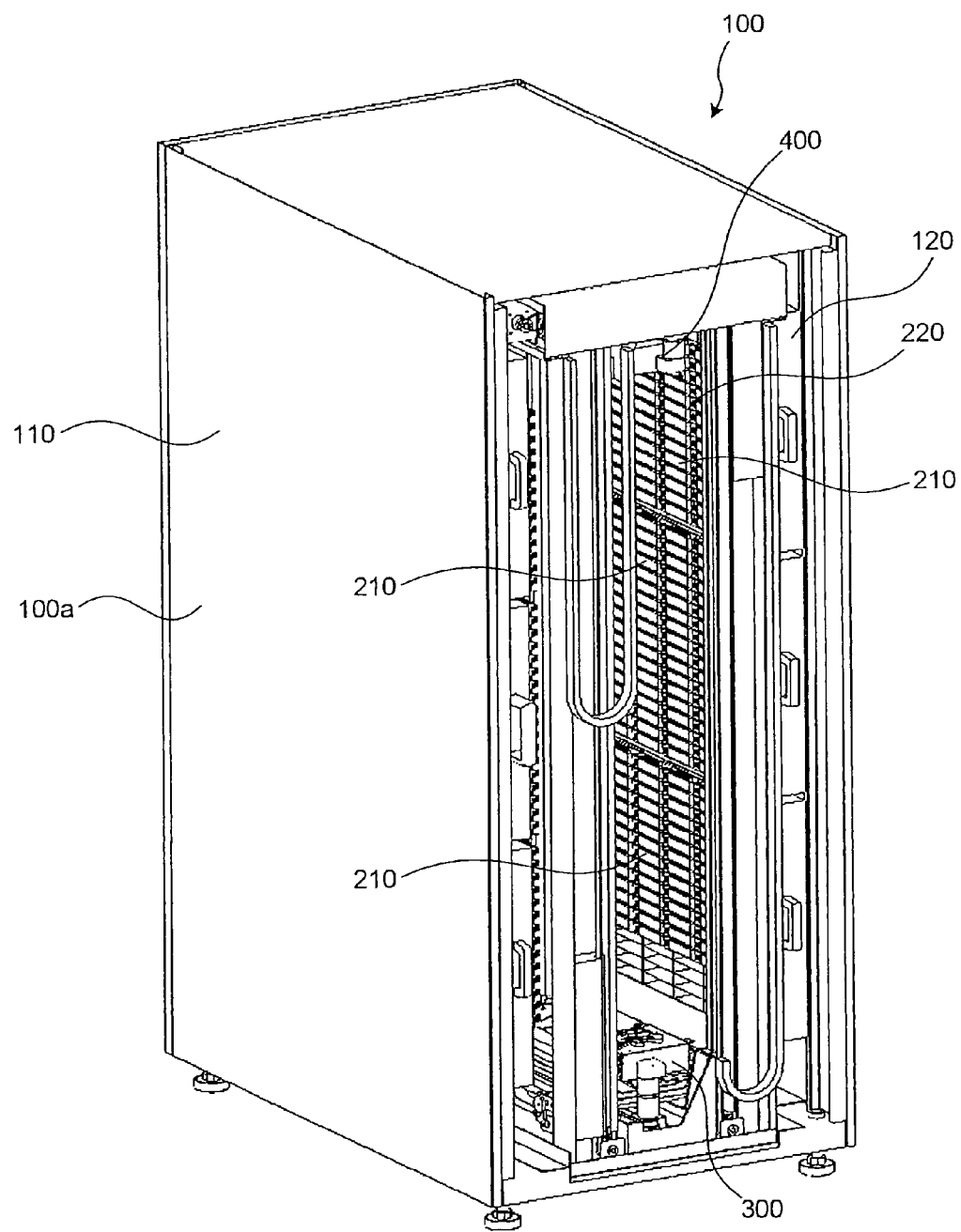
FIG. 1 is a perspective view of an entire library device according to an embodiment of the present invention.
Figure 2:
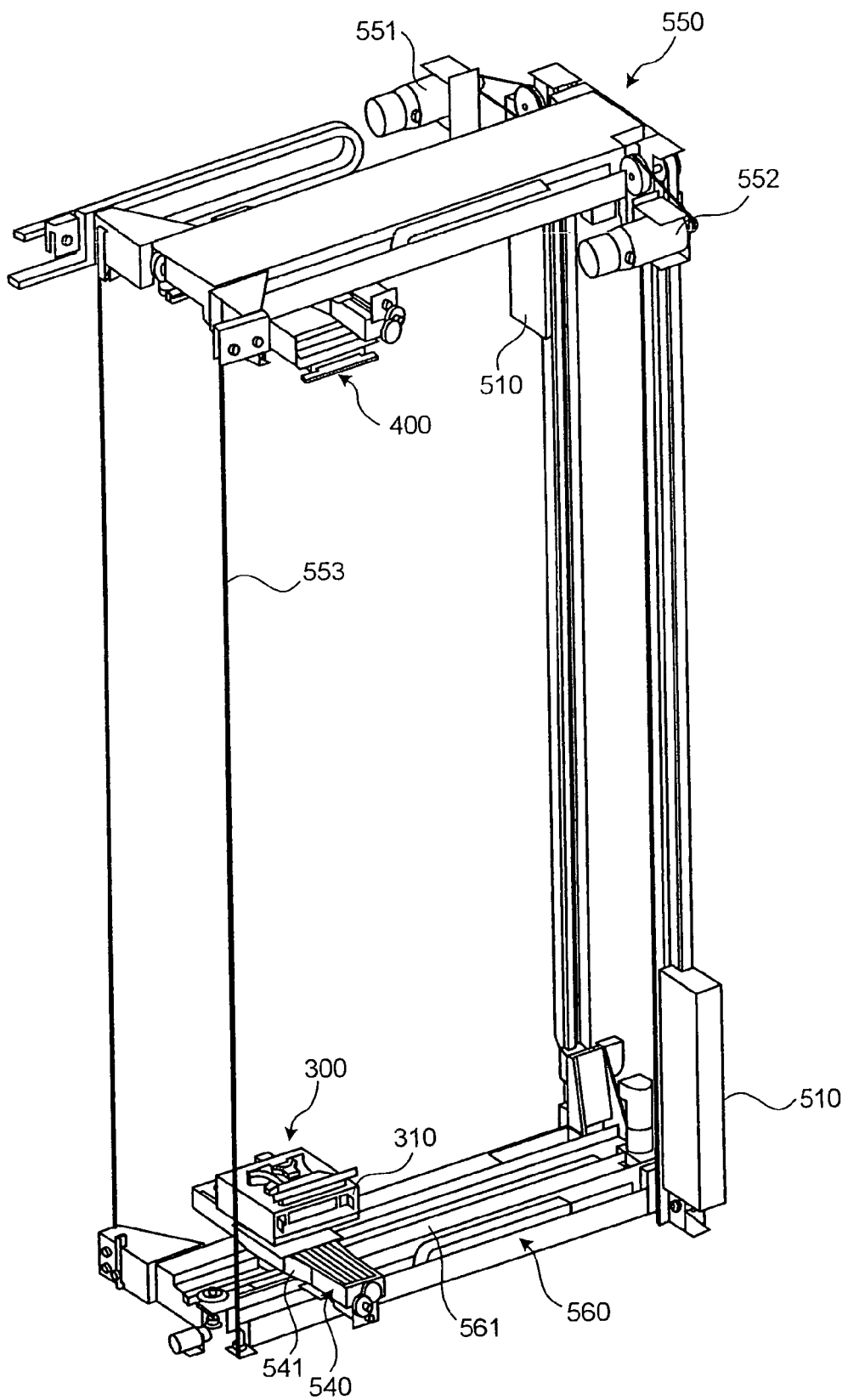
FIG. 2 is a schematic diagram of main components of the library device.
Figure 3:
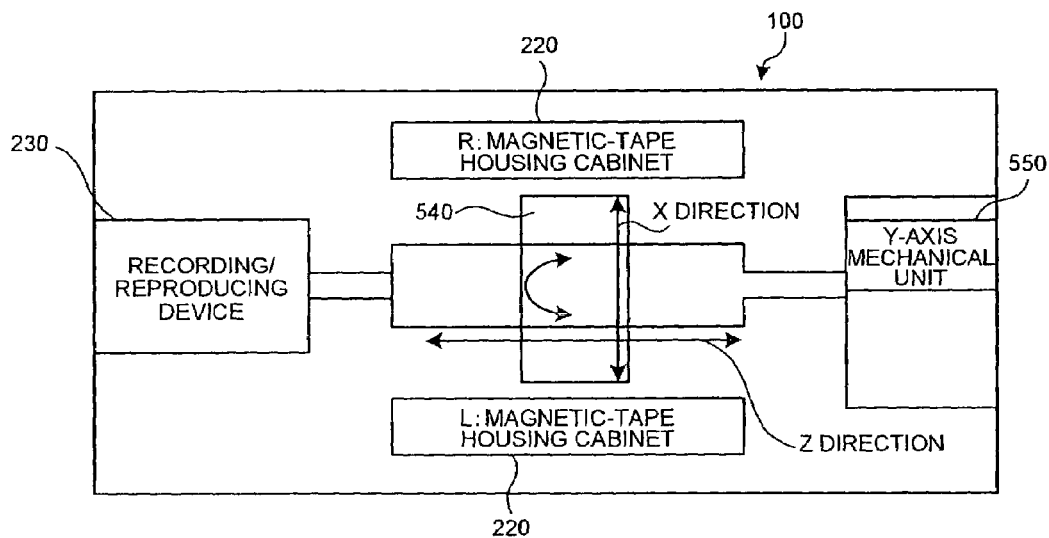
FIG. 3 is a schematic plan view of the library device.
Figure 4:
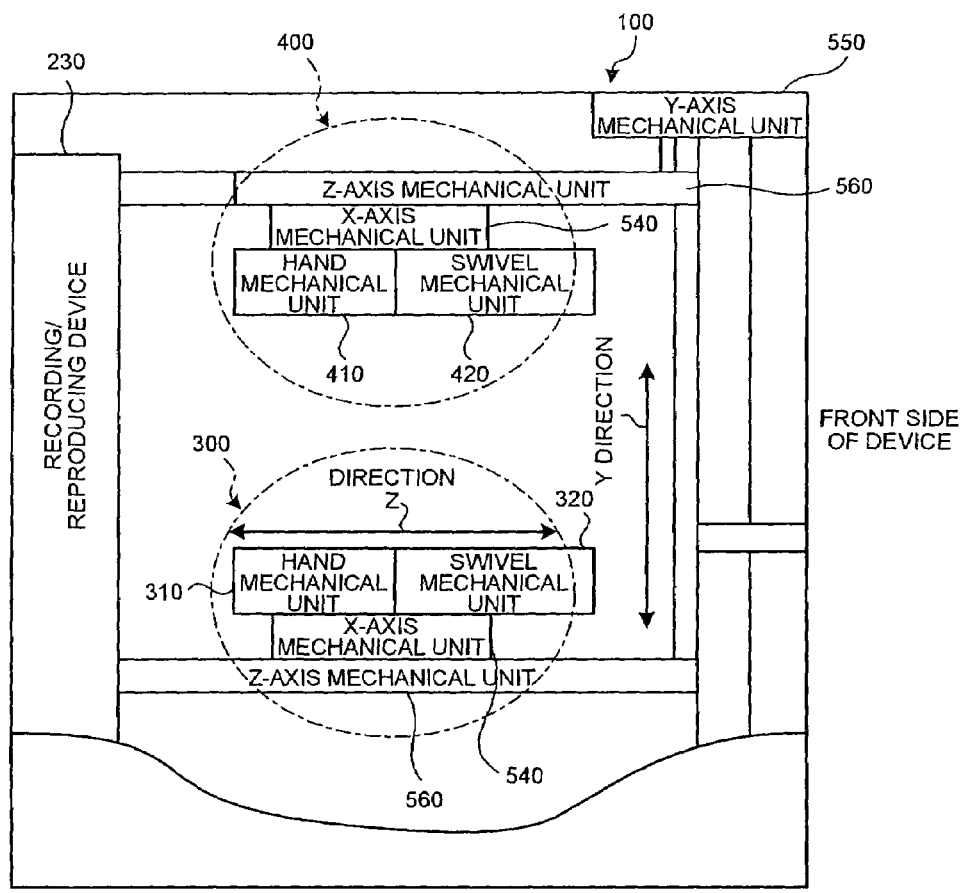
FIG. 4 is a schematic diagram of a lateral portion of the library device.
Figure 5:
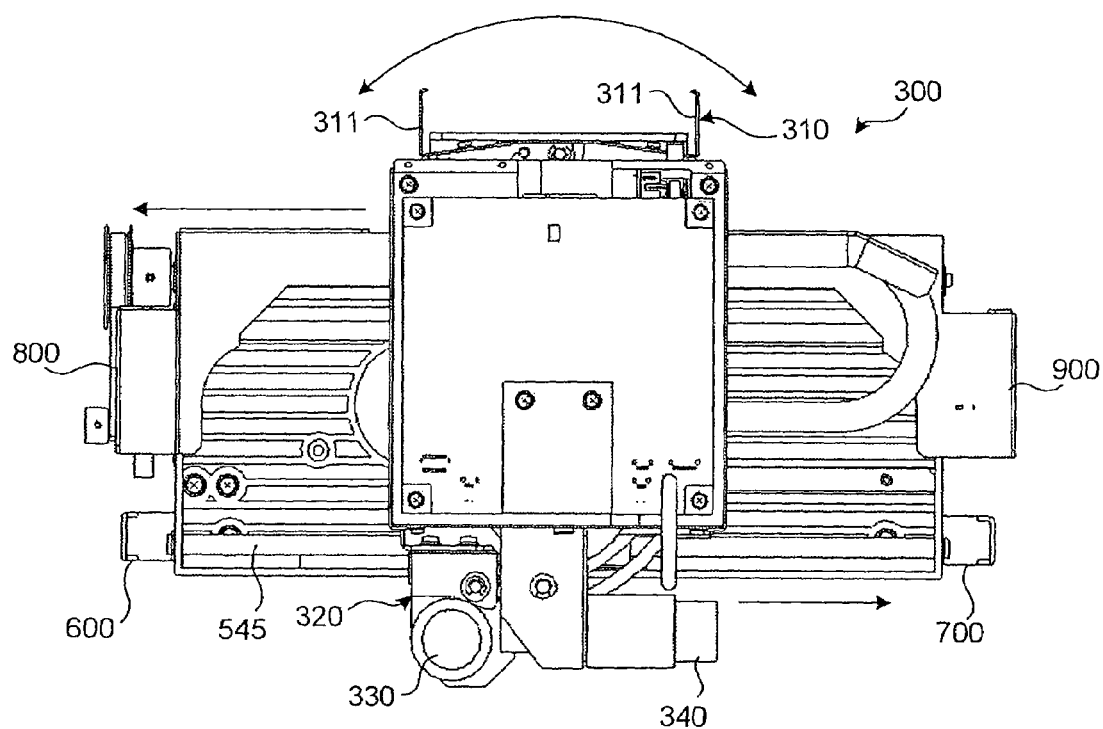
FIG. 5 is a schematic diagram of a first feeding mechanism.
Figure 5:
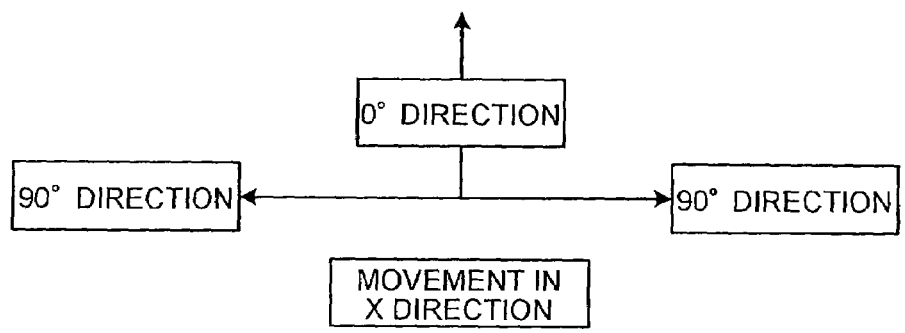
Figure 6:
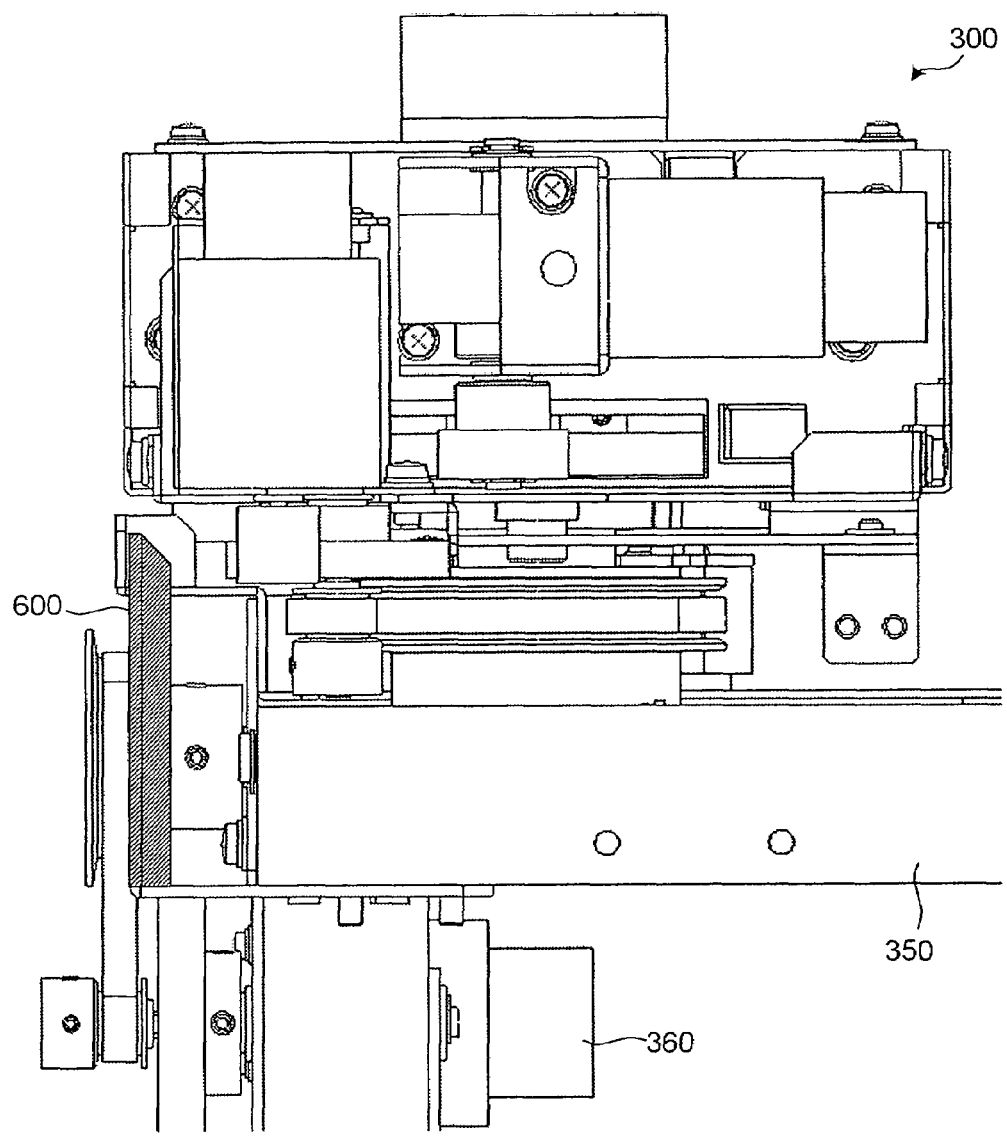
FIG. 6 is a schematic diagram of a lateral view of the first feeding mechanism when an inclination angle is 0 degree.

FIG. 1 is a perspective view of the entire library device. FIG. 2 is a schematic diagram of main components of the entire library device. FIG. 3 is a schematic plan view of the overview of the library device. FIG. 4 is a schematic diagram of the overview of a lateral portion of the library device. FIG. 5 is a schematic diagram of a plane view of a first feeding mechanism 300. FIG. 6 is a schematic diagram of a lateral portion of the first feeding mechanism 300 for explaining positions of stopper members 600, 700, 800, and 900 that are fixed to the first feeding mechanism 300. The present invention is not to be limited to the embodiment explained below.

A library device 100 according to the present invention includes the stopper members 600, 700, 800, and 900. During a movement of feeding mechanisms (the first feeding mechanism 300 and a second feeding mechanism 400), even if a direction (an inclination angle) of the feeding mechanisms stops at any angle (or stops at an angle other than a regulated angle), the stopper members 600 to 900 can stop the movement of the first feeding mechanism 300 in all directions (inclination angles). Thus, inclusion of the stopper members 600 to 900 is the salient feature of the library device 100 according to the present invention.

To be specific, the first feeding mechanism 300 includes the stopper members 600 to 900 at predetermined positions. If the first feeding mechanism 300 is abnormally overdriven, the stopper members 600 to 900 stop the movement of the first feeding mechanism 300 in X direction (a direction towards the housing cabinets 220 that are located either to the left or to the right). In other words, even if the direction (the inclination angle) of the first feeding mechanism 300 that is rotated by a swivel mechanical unit 320 is inclined at any angular position within a range of 180 degrees (from 90 degrees to 0 degree to −90 degrees), the stopper members 600 to 900 reliably stop the movement of the first feeding mechanism 300 according to each inclination angle and reliably prevent a magnetic tape cartridge from being damaged due to overdriving of the first feeding mechanism 300.

As shown in FIG. 1, the library device 100 is formed of a main chassis 100a, which includes an external locker 110 and an internal locker 120 that are entirely rectangular. The library device 100 includes a pair of the housing cabinets 220 to the left and to the right, the recording/reproducing device (Magnetic Tape Unit (MTU) 230 (shown in FIG. 3), the first feeding mechanism 300, and the second feeding mechanism 400. The housing cabinets 220 include a plurality of cells 210 (six in the example explained with reference to FIG. 1) that house multiple magnetic tape cartridges. The recording/reproducing device 230 performs recording/reproduction of data on the magnetic tape cartridges. The first feeding mechanism 300 and the second feeding mechanism 400 automatically feed to predetermined positions in the housing cabinets 220 (the cells 210), the magnetic tape cartridges between the housing cabinets 220 and the recording/reproducing device 230.

The overview of the structure of the library device 100 is explained below with reference to FIGS. 1 to 4. In other words, the library device 100 includes the housing cabinets 220, which are located at right and left (RL) positions of the library device 100, and the recording/reproducing device 230 (MTU/drive) that is arranged behind the library device 100. The recording/reproducing device 230 (MTU) includes a function that writes data to a recording medium (hereinafter, "magnetic tape cartridge") and reads data that is recorded in the magnetic tape cartridge.

The housing cabinets 220 house therein a necessary number of the magnetic tape cartridges. Further, based on a command notification from a host computer, the housing cabinets 220 cause the first feeding mechanism 300 and the second feeding mechanism 400 to selectively feed the magnetic tape cartridges to the recording/reproducing device 230 (MTU) and also cause the recording/reproducing device 230 (MTU) to carry out recording and reproduction of data.

Predetermined bar code labels are attached to the magnetic tape cartridges. A bar code reader reads the bar codes, thereby enabling to store the specified magnetic tape cartridges in predetermined storage spaces (inside the cells 210) and also enabling to carry out recording/reproduction of data on the specified magnetic tape cartridges.

As shown in FIGS. 1 and 4, in the library device 100 that is fitted inside the internal locker 120, the first feeding mechanism 300 and the second feeding mechanism 400 are movably arranged along a vertical column that is included in a vertical direction (Y axis direction). As shown in FIGS. 3 and 4, the first feeding mechanism 300 and the second feeding mechanism 400 include an X-axis mechanical unit 540, a Y-axis mechanical unit 550, and a Z-axis mechanical unit 560. The X-axis mechanical unit 540 moves the first feeding mechanism 300 and the second feeding mechanism 400 in an X axis direction (a direction of movement towards the housing cabinets 220 that are located to the left and to the right). The Y-axis mechanical unit 550 moves the first feeding mechanism 300 and the second feeding mechanism 400 in a Y axis direction (vertical direction). The Z-axis mechanical unit 560 moves the first feeding mechanism 300 and the second feeding mechanism 400 in a Z axis direction (anteroposterior direction of the library device 100).

The X-axis mechanical unit 540 includes a rail member 541 that causes the first feeding mechanism 300 and the second feeding mechanism 400 to move in the anteroposterior direction of the library device 100 and an X-axis mechanical unit driving motor 360 (shown in FIG. 6). An operation of the X-axis mechanical unit 540 enables to move the first feeding mechanism 300 and the second feeding mechanism 400 in a direction towards any of the housing cabinets 220 that are positioned to the left and to the right inside the library device 100.

The Y-axis mechanical unit 550 includes a feed driving motor 551 that moves the first feeding mechanism 300 in the vertical direction and a feed driving motor 552 that moves the second feeding mechanism 400 in the vertical direction. Further, a moving wire 553 is attached to a driving rotation axis of the feed driving motors 551 and 552. The moving wire 553 enables movement of the first feeding mechanism 300 and the second feeding mechanism 400 in the vertical direction.

The Z-axis mechanical unit 560 includes a moving member 561 that causes the first feeding mechanism 300 and the second feeding mechanism 400 to move in the anteroposterior direction (a direction along the front side of the library device 100 and the side facing the recording/reproducing device 230) of the library device 100. The moving member 561 is located at a position that is nearly perpendicular to the rail member 541 of the X-axis mechanical unit 540. The moving member 561 includes a function that causes the first feeding mechanism 300 and the second feeding mechanism 400 to move towards the recording/reproducing device 230 along a groove (not shown) that is formed on the moving member 561.

Hand mechanical units 310 and 410 include a function to hold the magnetic tape cartridges. Swivel mechanical units 320 and 420 include a function to rotate the inclination angle of the first feeding mechanism 300 and the second feeding mechanism 400 within the range of 180 degrees (from −90 degrees to 0 degree to 90 degrees) towards the housing cabinets 220.

Further, balancers 510, 510 are fixed at the ends of the moving wire 553. Basically, the balancers 510, 510 include a function to maintain a balance of the first feeding mechanism 300 and the second feeding mechanism 400. However, in the present embodiment, the balancers 510, 510 further include a function to smoothly lower (by increasing the weight of any one of the balancers 510) the first feeding mechanism 300 and the second feeding mechanism 400 when power to the first feeding mechanism 300 and the second feeding mechanism 400 is switched off.

In a commonly used magnetic tape library device, because the magnetic tape cartridges are inclined at a predetermined inclination angle to prevent the magnetic tape cartridges from falling out of the housing cabinets 220, a tilt mechanism is necessitated in a feeding mechanism for tilting a hand mechanical unit. However, in the present embodiment, because the housing cabinets 220 include a fall preventing mechanism, a necessity of the commonly used tilt mechanism is removed.

In the library device 100 having the structure mentioned earlier, generally the first feeding mechanism 300 performs feeding of the magnetic tape cartridges to the recording/reproducing device 230. The second feeding mechanism 400, which is arranged separately from the first feeding mechanism 300 at the top portion of the library device 100, is in a standby mode. When the first feeding mechanism 300 is not able to operate (due to maintenance or occurrence of a failure), the first feeding mechanism 300 is lowered till the lowest position of the library device 100 by a moving device and feeding of the magnetic tape cartridges is performed by the second feeding mechanism 400 that is in the standby mode and arranged at the top portion of the library device 100. In other words, even during maintenance of the first feeding mechanism 300, or when a component of the first feeding mechanism 300 suffers a failure, a failure of the system is prevented and the system can be run continuously.

Structures of the feeding mechanisms, which are the salient feature of the present invention, are explained in detail below. Because the structures which include the stopper members corresponding to the multiple movable stop positions are the salient feature of the present invention, among the two feeding mechanisms (the first feeding mechanism 300 and the second feeding mechanism 400), the first feeding mechanism 300 is used to explain the salient feature.

FIG. 5 is a schematic diagram of the first feeding mechanism 300. In other words, as shown in FIG. 5, the first feeding mechanism 300 is positioned in a top portion of an X-axis mechanical unit base portion 545. The first feeding mechanism 300 includes the hand mechanical unit 310 and the swivel mechanical unit 320. Further, a swivel motor 330, a hand motor 340, and the X-axis mechanical unit driving motor 360 (shown in FIG. 6) are fixed at predetermined positions of the X-axis mechanical unit base portion 545.

Based on a function included in the hand mechanical unit 310, a pair of holding pawls 311, 311 that are located at one end (top side in the example shown in FIG. 5) of the first feeding mechanism 300 use rotation of the hand motor 340 to hold the magnetic tape cartridges. Due to the movement of the first feeding mechanism 300, the magnetic tape cartridges, which are held by the holding pawls 311, 311 of the hand mechanical unit 310, are housed in any of the specified housing cabinets 220 that are located to the left and to the right. Further, at the time of recording/reproduction of data, based on a fetch instruction, the first feeding mechanism 300 feeds the housed magnetic tape cartridges to the recording/reproducing device 230.

The swivel mechanical unit 320 includes a function to use the rotation of the swivel motor 330 and rotate the inclination angle (actually the direction of the hand mechanical unit 310) of the first feeding mechanism 300 within the range of 180 degrees (from −90 degrees to 0 degree to 90 degrees) towards any of the housing cabinets 220 that are positioned to the left and to the right inside the library device 100.

Inside a base unit 350 (shown in FIG. 6), which forms the X-axis mechanical unit base portion 545, a gear shaft is included in a lateral direction of the base unit 350 and a moving block member (not shown) is included that is screwed to the gear shaft. The X-axis mechanical unit base portion 545 is fixed to the top end of the moving block member. The moving block member moves in the anteroposterior direction (horizontal direction in the example shown in FIG. 5) along with the rotation of the gear shaft. Thus, the gear shaft, which is linked to a driver of a pulley, starts rotating due to driving of the X-axis mechanical unit driving motor 360, thereby causing the first feeding mechanism 300 to move in the X direction along with the anteroposterior movement of the moving block member.

Further, the stopper members 600 to 900 are fixed to the X-axis mechanical unit base portion 545 at the predetermined positions (four places in the horizontal direction and the vertical direction). Each of the stopper members 600 to 900 corresponds to the movement stroke by the first feeding mechanism 300 and the inclination angle that is the movable stop position of the first feeding mechanism 300 at the time of movement. Each of the stopper members 600 to 900 includes a function to stop the movement of the first feeding mechanism 300.

The stopper members 600 and 700, which are located at the bottom left and right positions (bottom side in the example shown in FIG. 5) of the X-axis mechanical unit base portion 545 function when the inclination angle of the first feeding mechanism 300 is 90 degrees. Similarly, the stopper members 800 and 900, which are located at the top left and right positions of the X-axis mechanical unit base portion 545 (top side in the example shown in FIG. 5) function when the inclination angle of the first feeding mechanism 300 is greater than or equal to 0 degree. Shapes of the stopper members 600 to 900 are selected according to the functions of the stopper members 600 to 900. The shapes of the stopper members 600 to 900 are explained in detail later.

FIG. 6 is a schematic diagram of a lateral view of the first feeding mechanism 300 shown in FIG. 5. A movement of the first feeding mechanism 300, which is in a 0 degree direction, in the X direction is indicated with reference to FIG. 6. As shown in FIG. 6, even if the first feeding mechanism 300 deviates from a regulated stop position, the first feeding mechanism 300 comes in contact with the stopper member 600 and the movement of the first feeding mechanism 300 is stopped.

Figure 7:
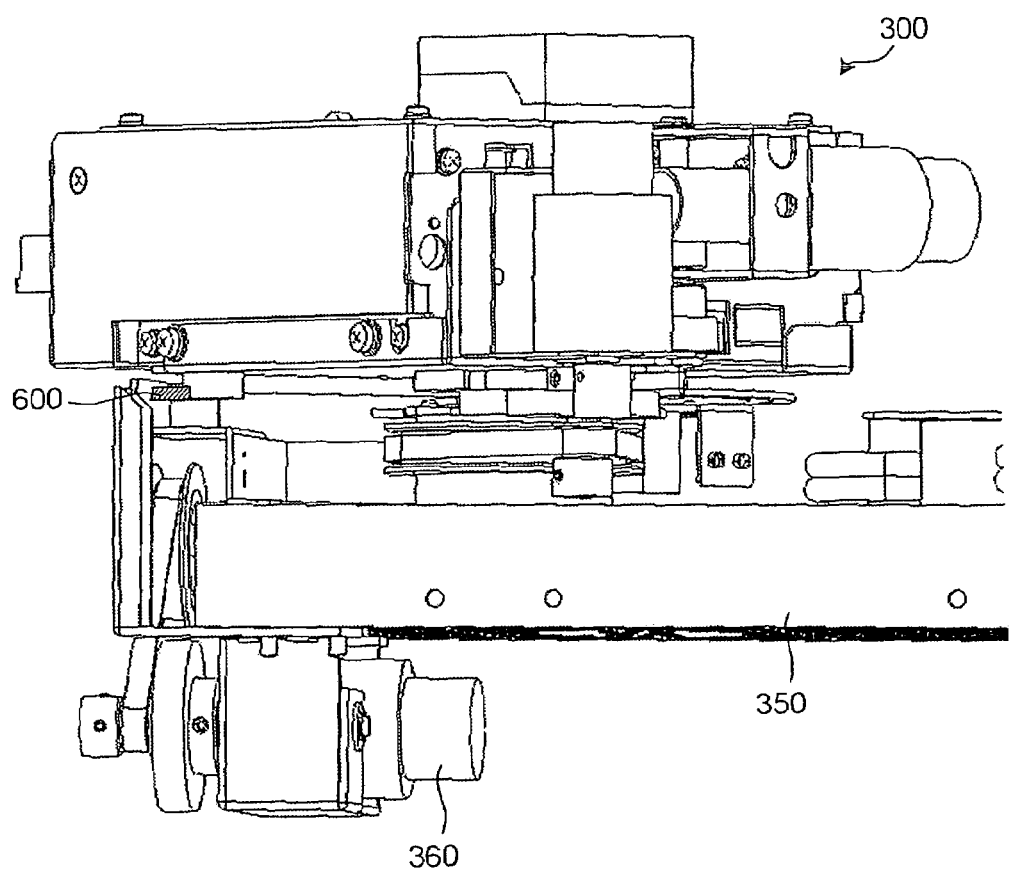
FIG. 7 is a schematic diagram of a lateral view of the first feeding mechanism when the inclination angle is greater than or equal to 0 degree.

Similarly, FIG. 7 is a schematic diagram of another lateral view of the first feeding mechanism 300 shown in FIG. 5. A swivel direction of the swivel mechanical unit 320 not stopping at a regulated angle is indicated with reference to FIG. 7. As shown in FIG. 7, even if the first feeding mechanism 300 stops at any angular position within the range of 180 degrees (from −90 degrees to 0 degree to 90 degrees) and moves in the X direction, the first feeding mechanism 300 comes in contact with the stopper member 600 and the movement of the first feeding mechanism 300 is stopped.

Figure 8:
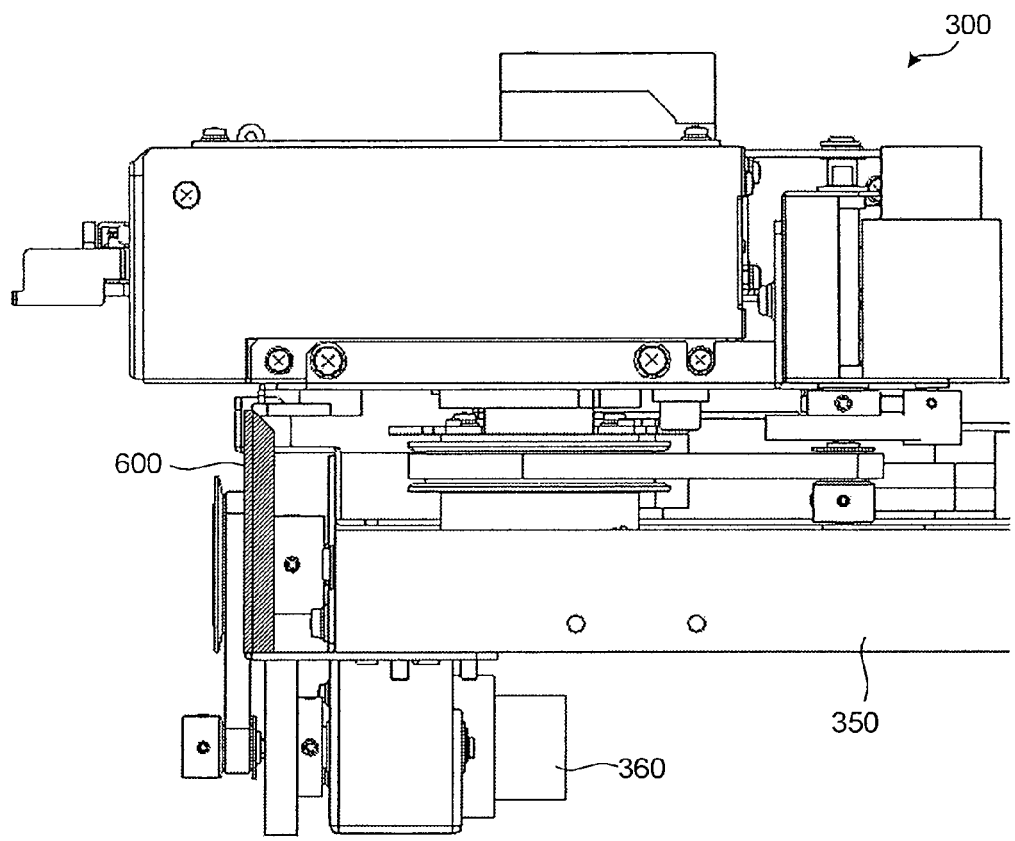
FIG. 8 is a schematic diagram of a lateral view of the first feeding mechanism when the inclination angle is 90 degrees.

Similarly, FIG. 8 is a schematic diagram of another lateral view of the first feeding mechanism 300. FIG. 8 is a schematic for explaining a deviation of the first feeding mechanism 300 from the regulated stop position when the first feeding mechanism 300 turns towards a 90 degree direction and moves in the X direction due to the swivel mechanical unit 320. As shown in FIG. 8, the first feeding mechanism 300 comes in contact with the stopper member 600 and the movement of the first feeding mechanism 300 is stopped.

Figure 9:
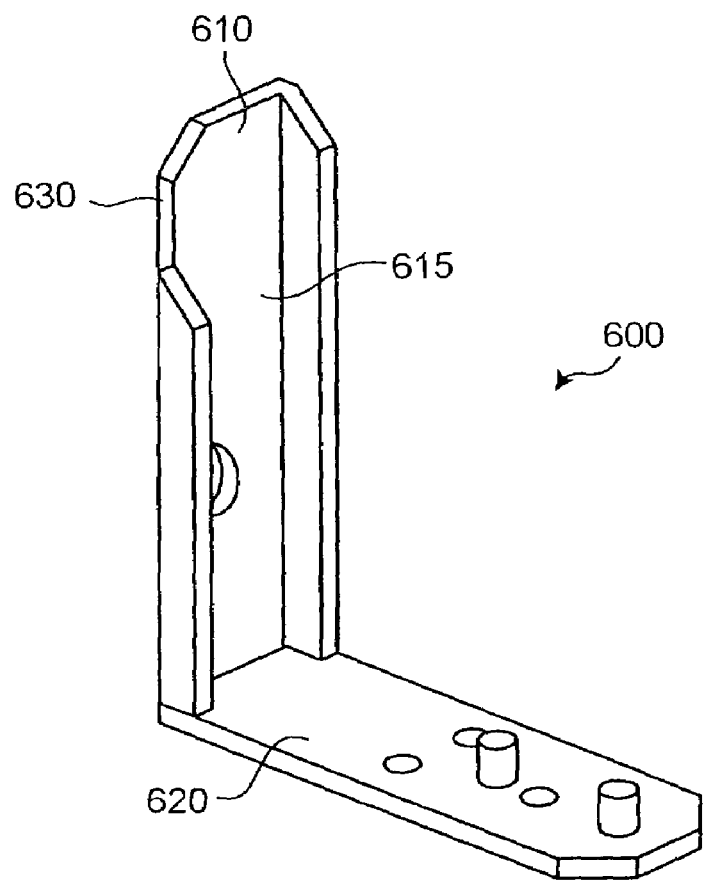
FIG. 9 is a perspective view of a stopper member that is arranged at a left bottom position shown in FIG. 5.
Figure 10:
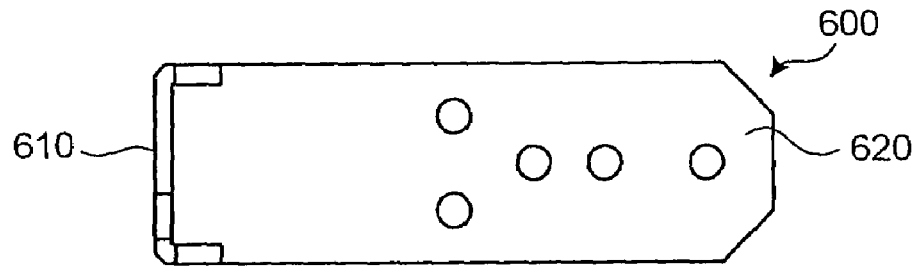
FIG. 10 is a schematic diagram of a plane view of the stopper member shown in FIG. 9.
Figure 11:
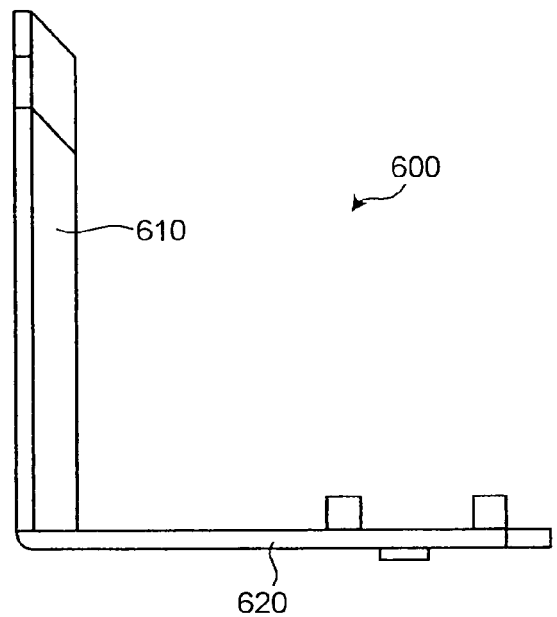
FIG. 11 is a schematic diagram of a lateral view of the stopper member shown in FIG. 9.

The shapes of the stopper members 600 to 900 arranged on the first feeding mechanism 300 are explained in detail with reference to FIGS. 9 to 21. The stopper member 600 fixed at the left bottom position of the first feeding mechanism 300 shown in FIG. 5 is explained first. FIG. 9 is a perspective view of the stopper member 600. FIG. 10 is a schematic diagram of a plane view of the stopper member 600. FIG. 11 is a schematic diagram of a lateral view of the stopper member 600.

As shown in FIG. 9, the stopper member 600 is formed of an L shaped steel plate. The stopper member 600 includes a vertical plate 610 that stands erect in an upward direction and a horizontal plate 620 that extends in a nearly perpendicular direction from a bottom edge of the vertical plate 610. A notch 630 is formed at one end of the vertical plate 610 as an escape unit. An inner surface 615 of the vertical plate 610 functions as a portion that comes in contact with a stopper block member 546.

Figure 12:
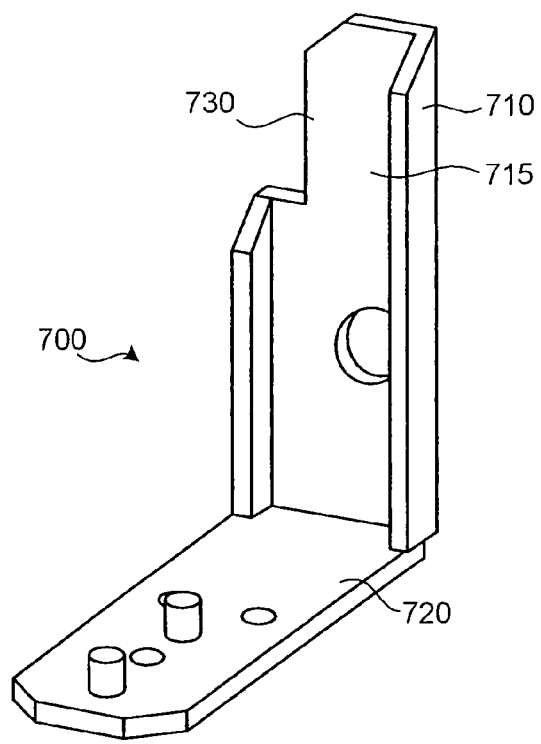
FIG. 12 is a perspective view of a stopper member that is arranged at a right bottom position shown in FIG. 5.
Figure 13:
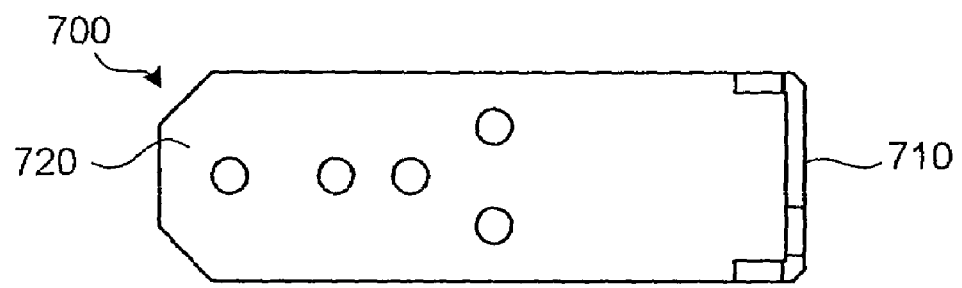
FIG. 13 is a schematic diagram of a plane view of the stopper member shown in FIG. 12.
Figure 14:
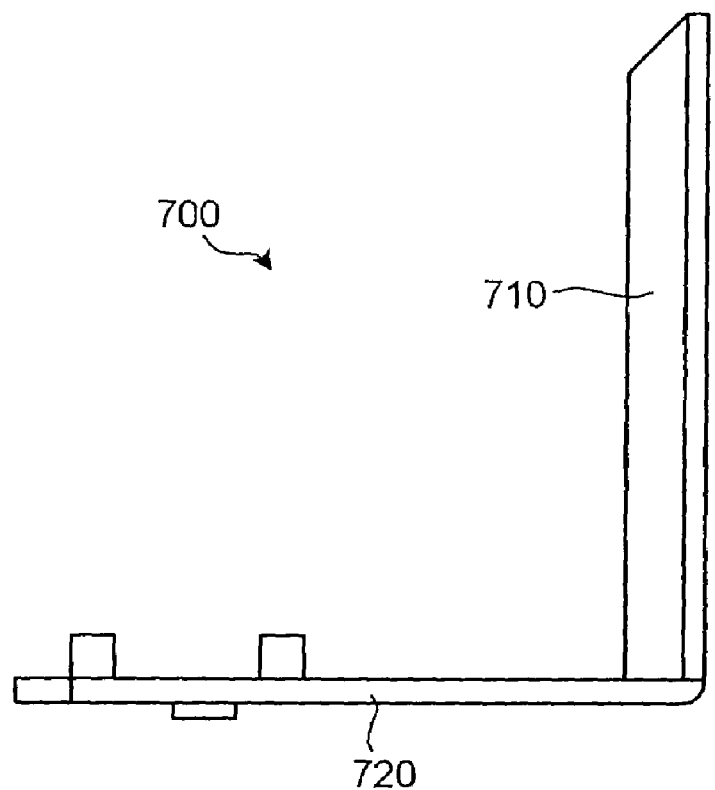
FIG. 14 is a schematic diagram of a lateral view of the stopper member shown in FIG. 12.

The stopper member 700 fixed at the right bottom position of the first feeding mechanism 300 is explained next. FIG. 12 is a perspective view of the stopper member 700. FIG. 13 is a schematic diagram of a plane view of the stopper member 700. FIG. 14 is a schematic diagram of a lateral view of the stopper member 700. As shown in FIG. 12, the shape of the stopper member 700 is nearly the same as the shape of the stopper member 600. In other words, the stopper member 700 is formed of the L shaped steel plate and includes a vertical plate 710 that stands erect in the upward direction and a horizontal plate 720 that extends in nearly perpendicular direction from the bottom edge of the vertical plate 710. A notch 730 is formed at one end of the vertical plate 710 as an escape unit. An inner surface 715 of the vertical plate 710 functions as a portion that comes in contact with the stopper block member 546 shown in FIG. 6.

Figure 15:
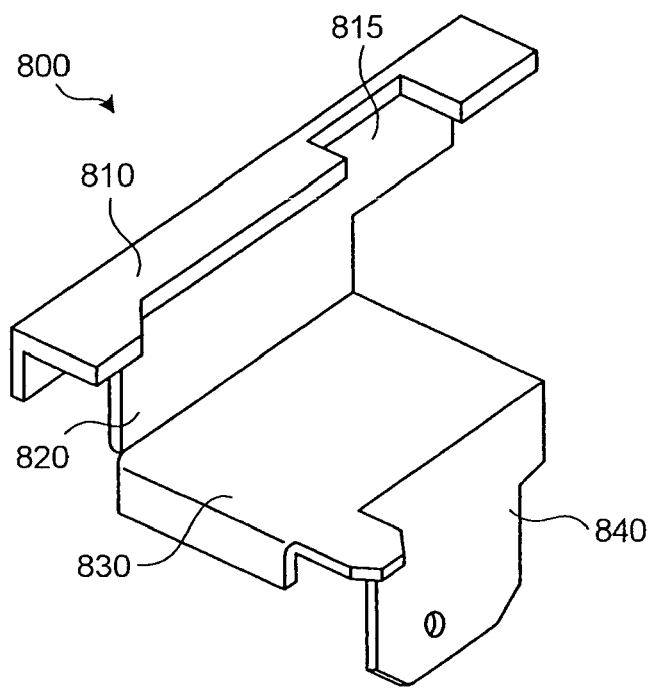
FIG. 15 is a perspective view of a stopper member that is arranged at a left top position shown in FIG. 5.
Figure 16:
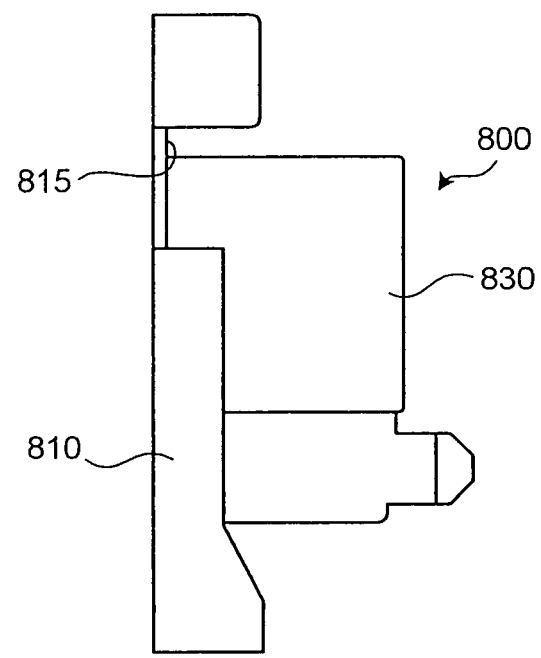
FIG. 16 is a schematic diagram of a plane view of the stopper member shown in FIG. 15.
Figure 17:
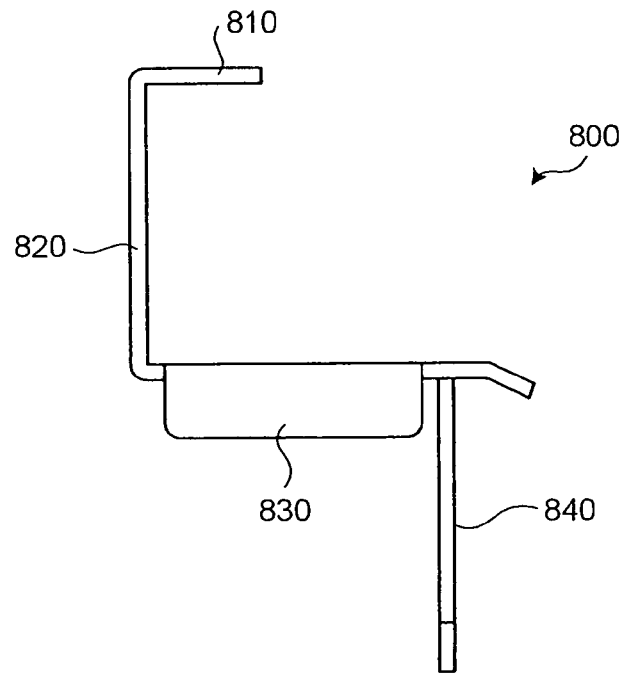
FIG. 17 is a schematic diagram of a lateral view of the stopper member shown in FIG. 15.

The stopper member 800 fixed at the left top position of the first feeding mechanism 300 is explained next. FIG. 15 is a perspective view of the stopper member 800. FIG. 16 is a schematic diagram of a plane view of the stopper member 800. FIG. 17 is a schematic diagram of a lateral view of the stopper member 800. As shown in FIG. 15, the stopper member 800 is formed of steel plates and includes bent plates 820 and 830 that are bent in nearly perpendicular direction to each other, a top plate 810 that is formed in the upward direction of the bent plate 820, and a bottom plate 840 that extends in nearly perpendicular direction of the bent plate 830. A notch 815, which is formed at one end of the top plate 810 functions as an escape unit. Further, an inner end of the top plate 810 functions as a portion that comes in contact with the stopper block member 546.

Figure 18:
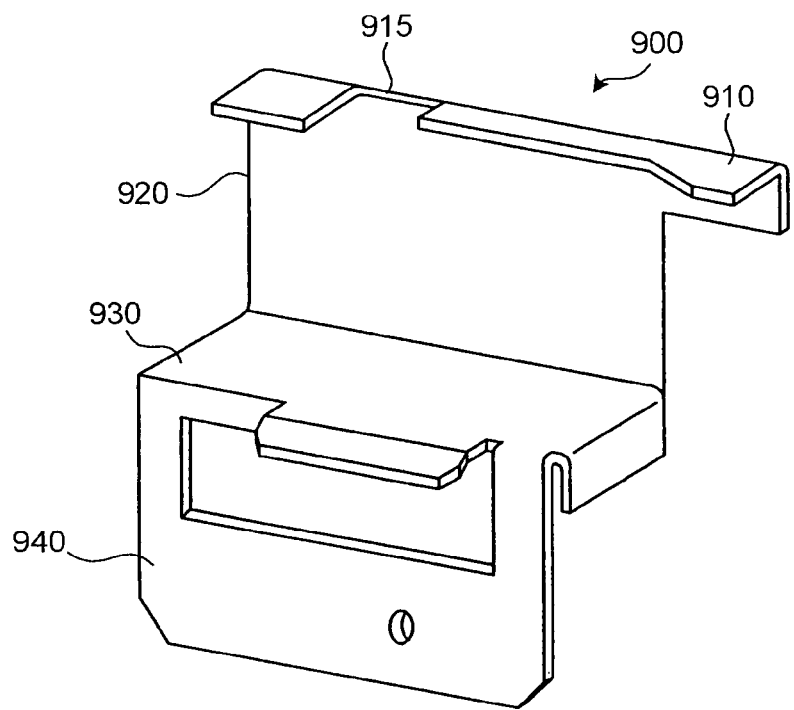
FIG. 18 is a perspective view of a stopper member that is arranged at a right top position shown in FIG. 5.
Figure 19:
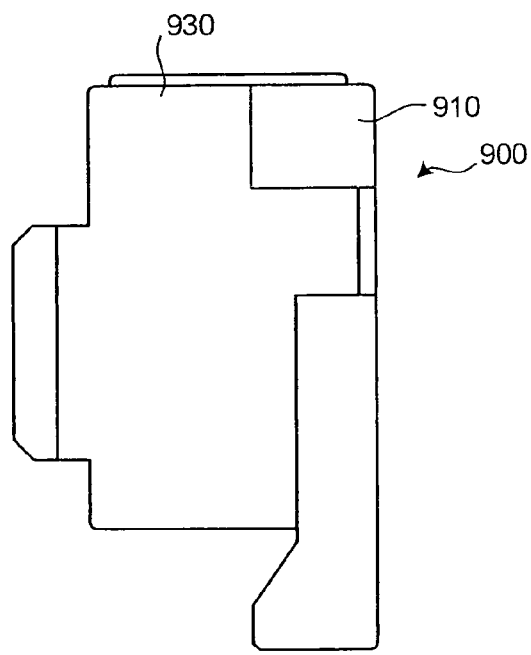
FIG. 19 is a schematic diagram of a plane view of the stopper member shown in FIG. 18.
Figure 20:
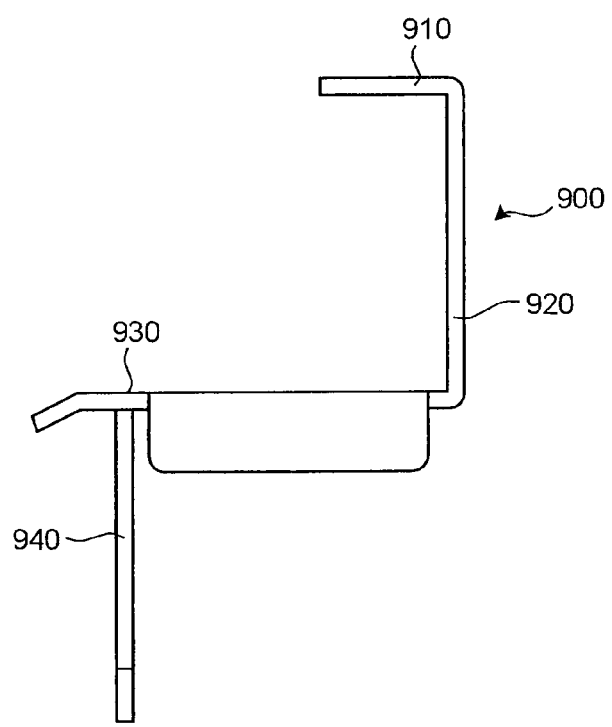
FIG. 20 is a schematic diagram of a lateral view of the stopper member shown in FIG. 18.

The stopper member 900 fixed at the right top position of the first feeding mechanism 300 is explained next. FIG. 18 is a perspective view of the stopper member 800. FIG. 19 is a schematic diagram of a plane view of the stopper member 900. FIG. 20 is a schematic diagram of a lateral view of the stopper member 900. As shown in FIG. 18, the shape of the stopper member 900 is nearly the same as the shape of the stopper member 800. In other words, the stopper member 900 is formed of steel plates and includes bent plates 920 and 930 that are bent in nearly perpendicular direction to each other, a top plate 910 that is formed in the upward direction of the bent plate 920, and a bottom plate 940 that extends in nearly perpendicular direction of the bent plate 930. A notch 915, which is formed at one end of the top plate 910 functions as an escape unit. Further, an inner end of the top plate 910 functions as a portion that comes in contact with the stopper block member 546.

A positional relation of each stopper member according to the direction of the first feeding mechanism 300 is explained in detail with reference to FIGS. 21 to 30. As shown in FIGS. 21 to 30, for clearly indicating the positional relation of each stopper member, a representation of the first feeding mechanism 300 is omitted.

Figure 21:
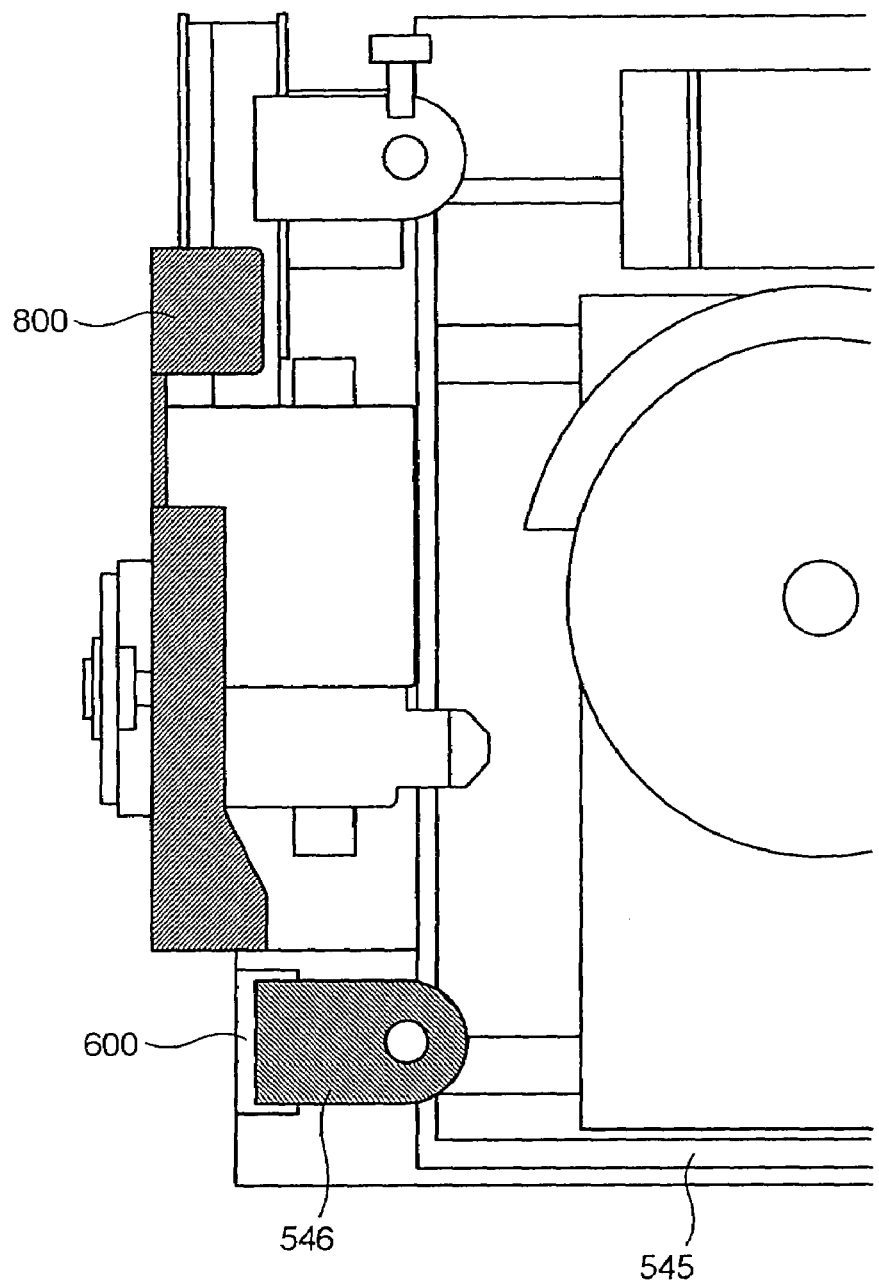
FIG. 21 is a schematic diagram of a top view of the first feeding mechanism shown in FIG. 5 when the inclination angle is 90 degrees.
Figure 22:
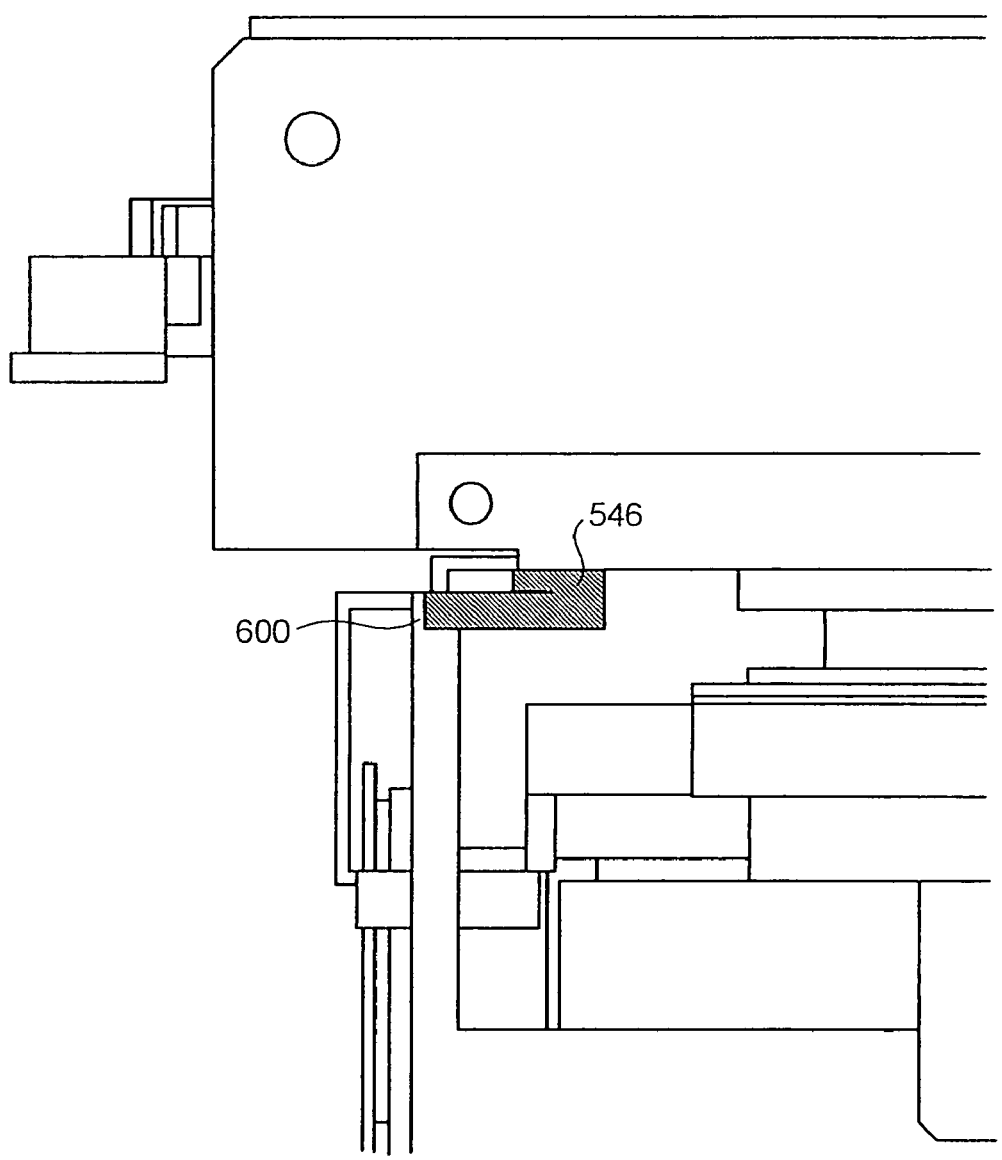
FIG. 22 is a schematic diagram of a lateral view of the first feeding mechanism shown in FIG. 21.

FIG. 21 is a schematic diagram of a top view (a plane view of the important components shown in FIG. 5) of the X-axis mechanical unit base portion 545 when the inclination angle is 90 degrees. FIG. 22 is a schematic diagram of a lateral view of the X-axis mechanical unit base portion 545 when the inclination angle is 90 degrees. In other words, as shown in FIGS. 21 and 22, when the first feeding mechanism 300 is turned to an angle of 90 degrees and moves for a predetermined distance (greater than or equal to 105 mm) in the X direction, the inner surface 615 of the stopper member 600 (shown in FIG. 5) that is arranged on the X-axis mechanical unit base portion 545 hits the edge surface of the stopper block member 546.

Figure 23:
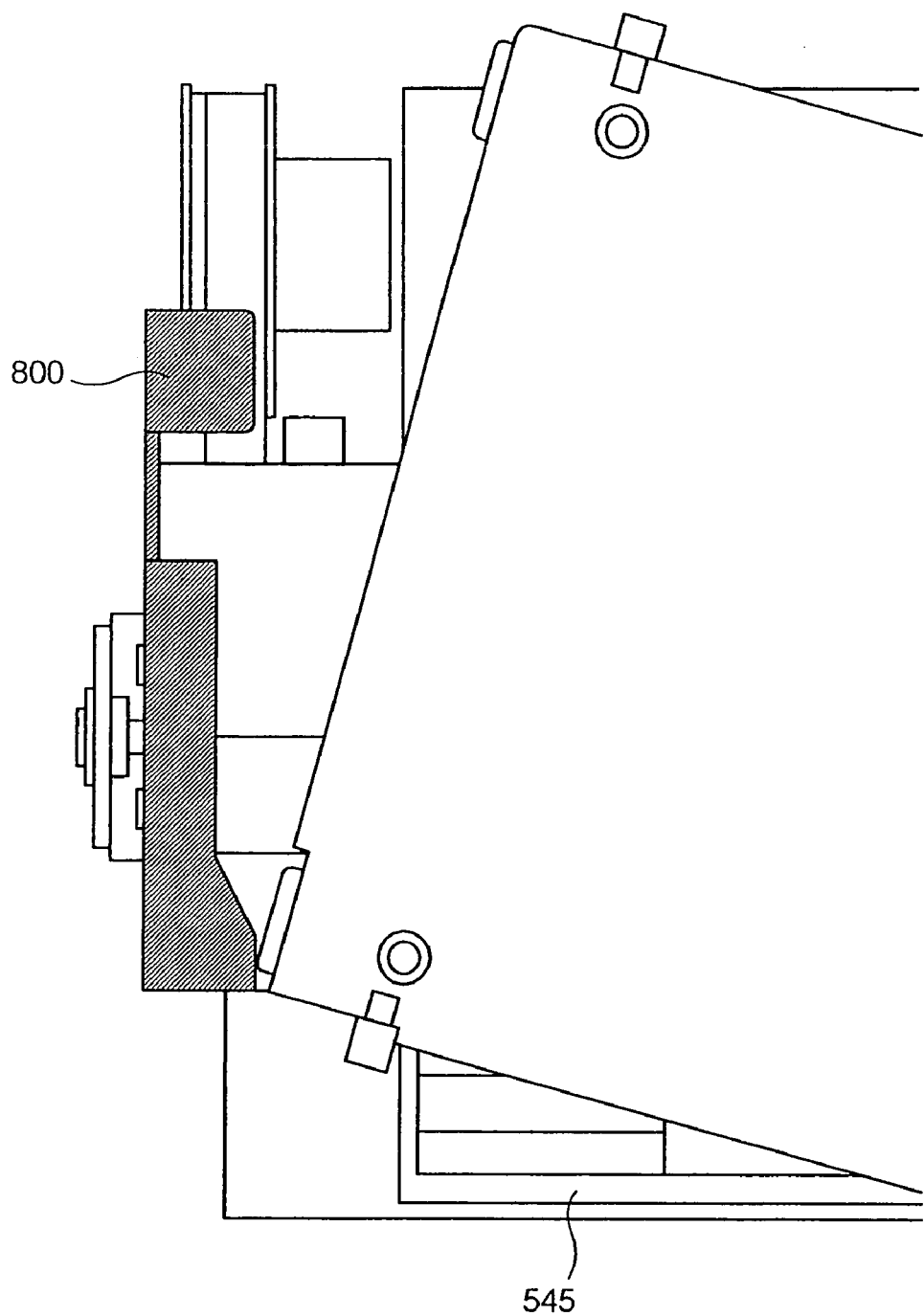
FIG. 23 is a schematic diagram of a top view of the first feeding mechanism shown in FIG. 5 when the inclination angle is 75 degrees.
Figure 24:
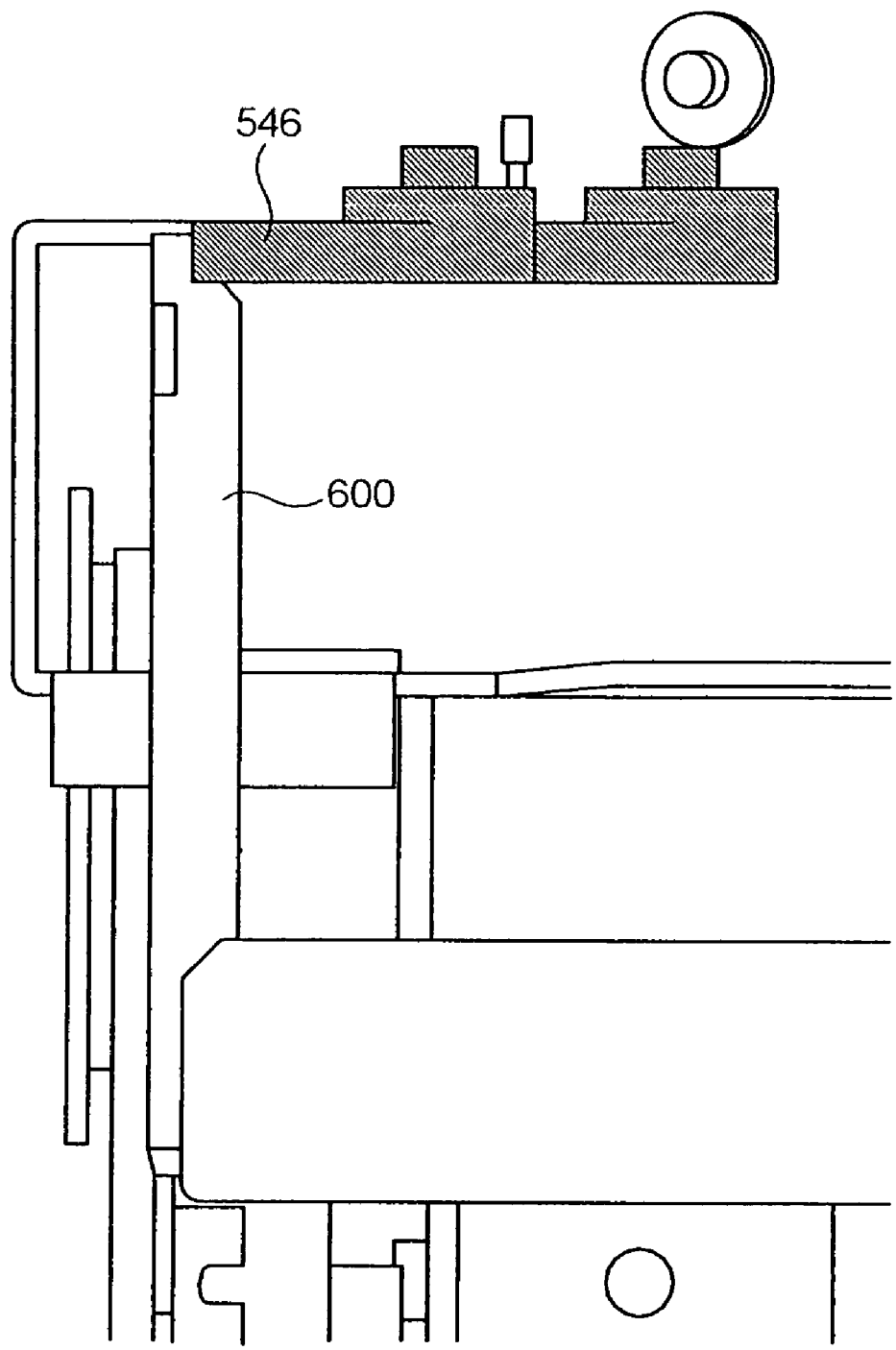
FIG. 24 is a schematic diagram of a lateral view of the first feeding mechanism shown in FIG. 23.

FIG. 23 is a schematic diagram of a top view of the X-axis mechanical unit base portion 545 when the inclination angle is 75 degrees. FIG. 24 is a schematic diagram of a lateral view of the X-axis mechanical unit base portion 545 when the inclination angle is 75 degrees. In other words, as shown in FIGS. 23 and 24, when the first feeding mechanism 300 is turned to an angle of 75 degrees and moves for a predetermined distance (greater than or equal to 105 mm) in the X direction, the stopper member 800 (shown in FIG. 5) that is arranged on the X-axis mechanical unit base portion 545 hits the edge surface of the stopper block member 546.

Figure 25:
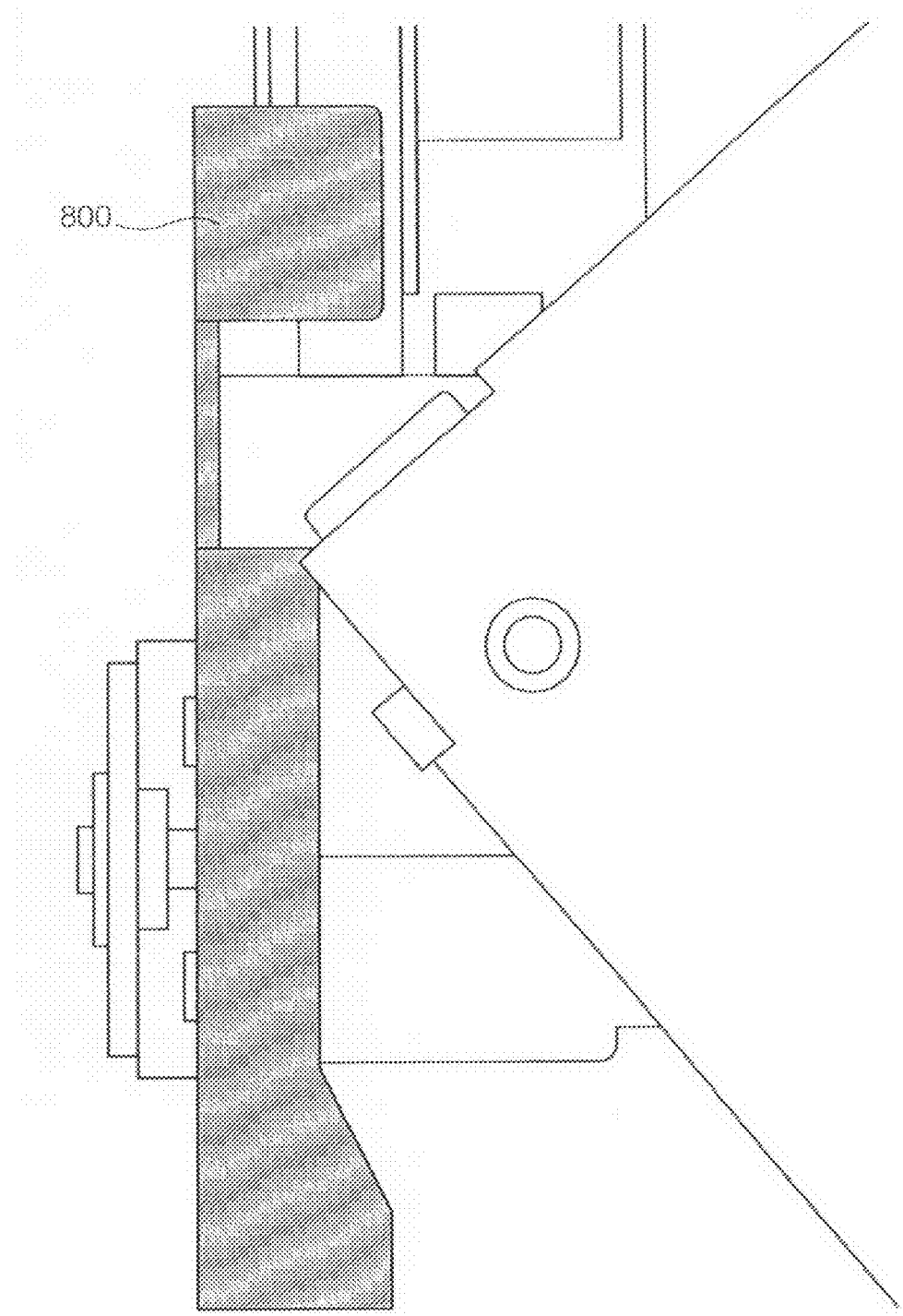
FIG. 25 is a schematic diagram of a top view of the first feeding mechanism shown in FIG. 5 when the inclination angle is 40 degrees.
Figure 26:
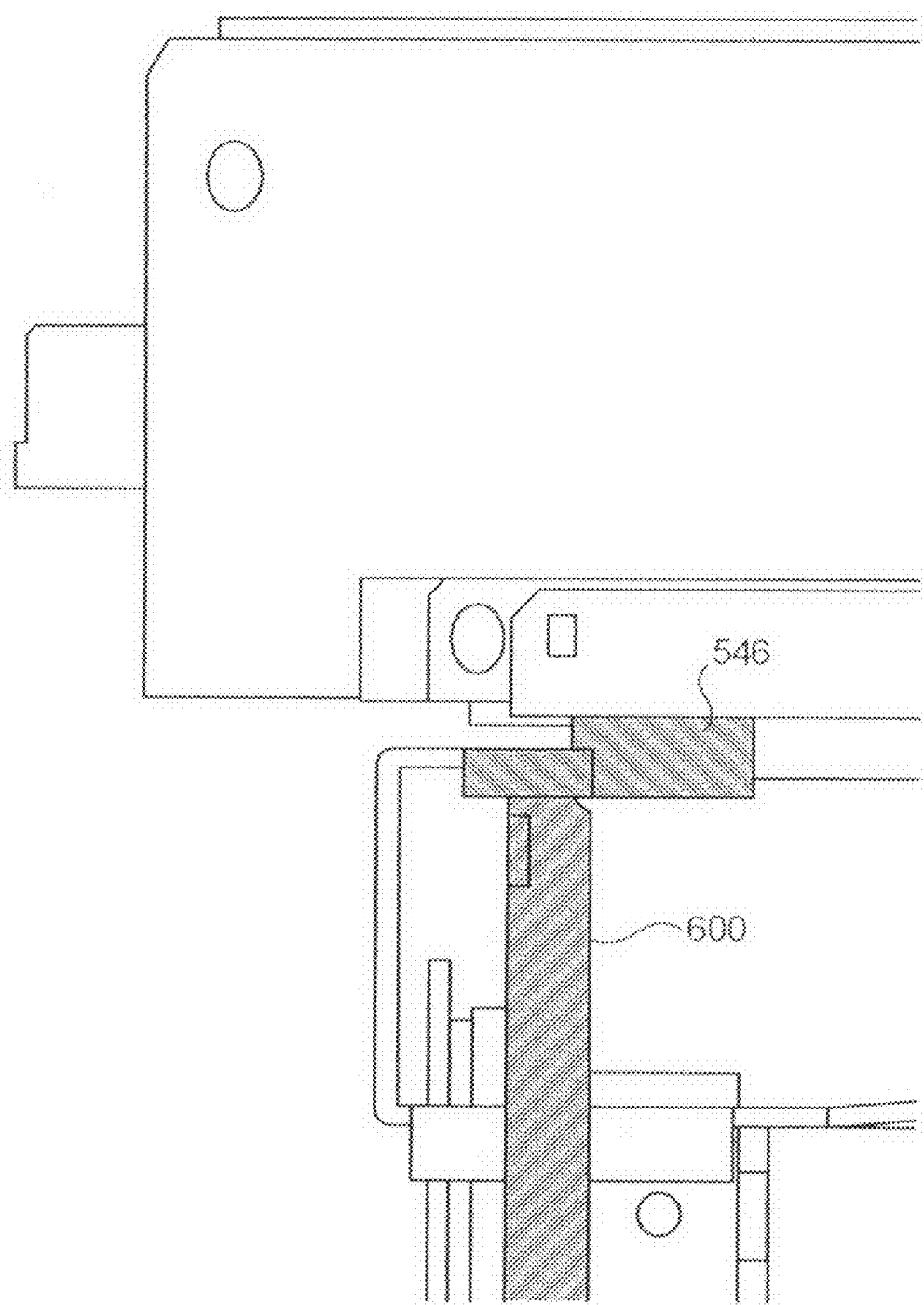
FIG. 26 is a schematic diagram of a lateral view of the first feeding mechanism shown in FIG. 25.

FIG. 25 is a schematic diagram of a top view of the X-axis mechanical unit base portion 545 when the inclination angle is 40 degrees. FIG. 26 is a schematic diagram of a lateral view of the X-axis mechanical unit base portion 545 when the inclination angle is 40 degrees. In other words, as shown in FIGS. 25 and 26, when the first feeding mechanism 300 is turned to an angle of 40 degrees and moves for a predetermined distance (greater than or equal to 105 mm) in the X direction, the stopper member 800 (shown in FIG. 5) that is arranged on the X-axis mechanical unit base portion 545 hits the edge surface of the stopper block member 546.

Figure 27:
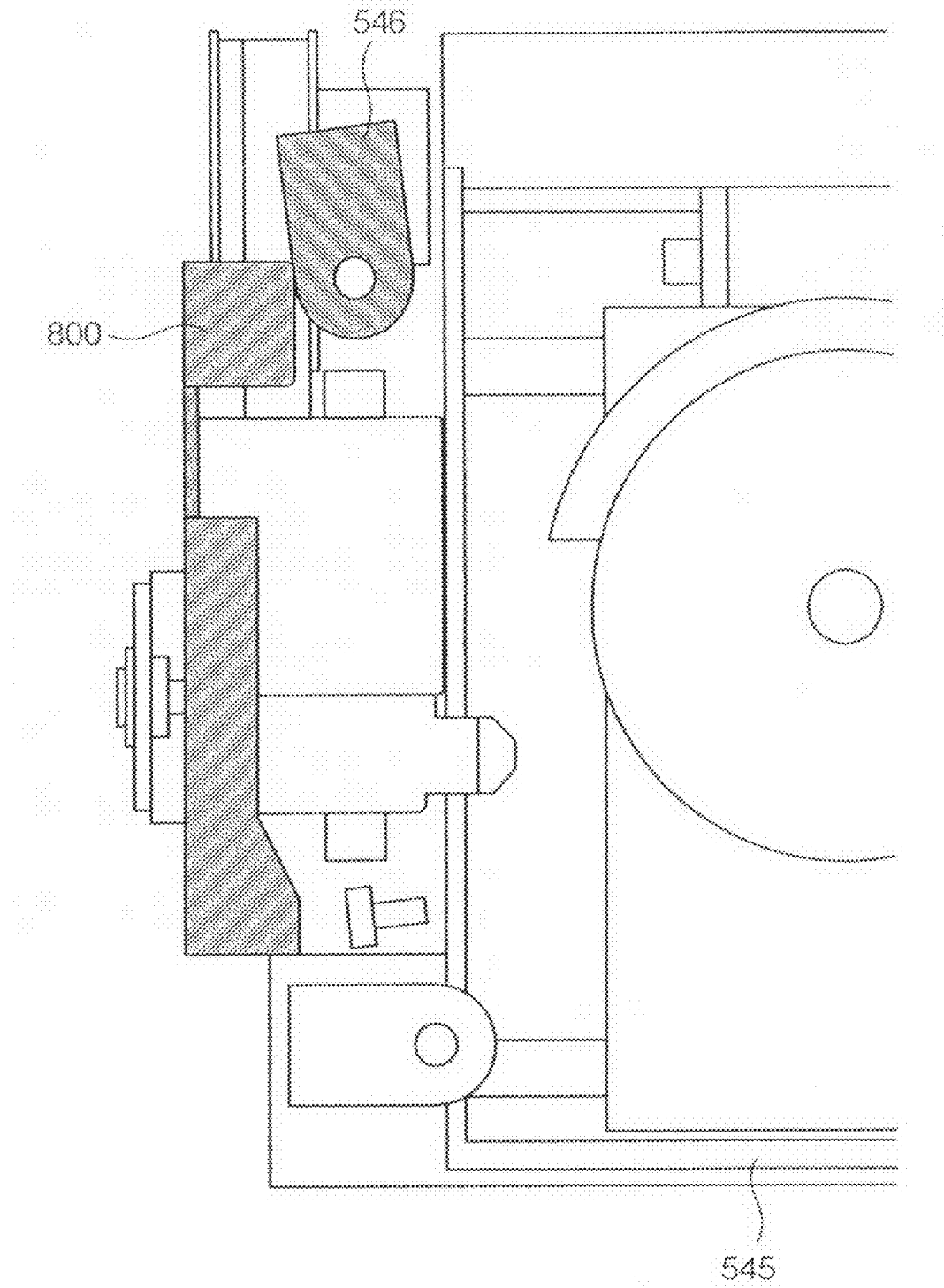
FIG. 27 is a schematic diagram of a top view of the first feeding mechanism shown in FIG. 5 when the inclination angle is 20 degrees.
Figure 28:
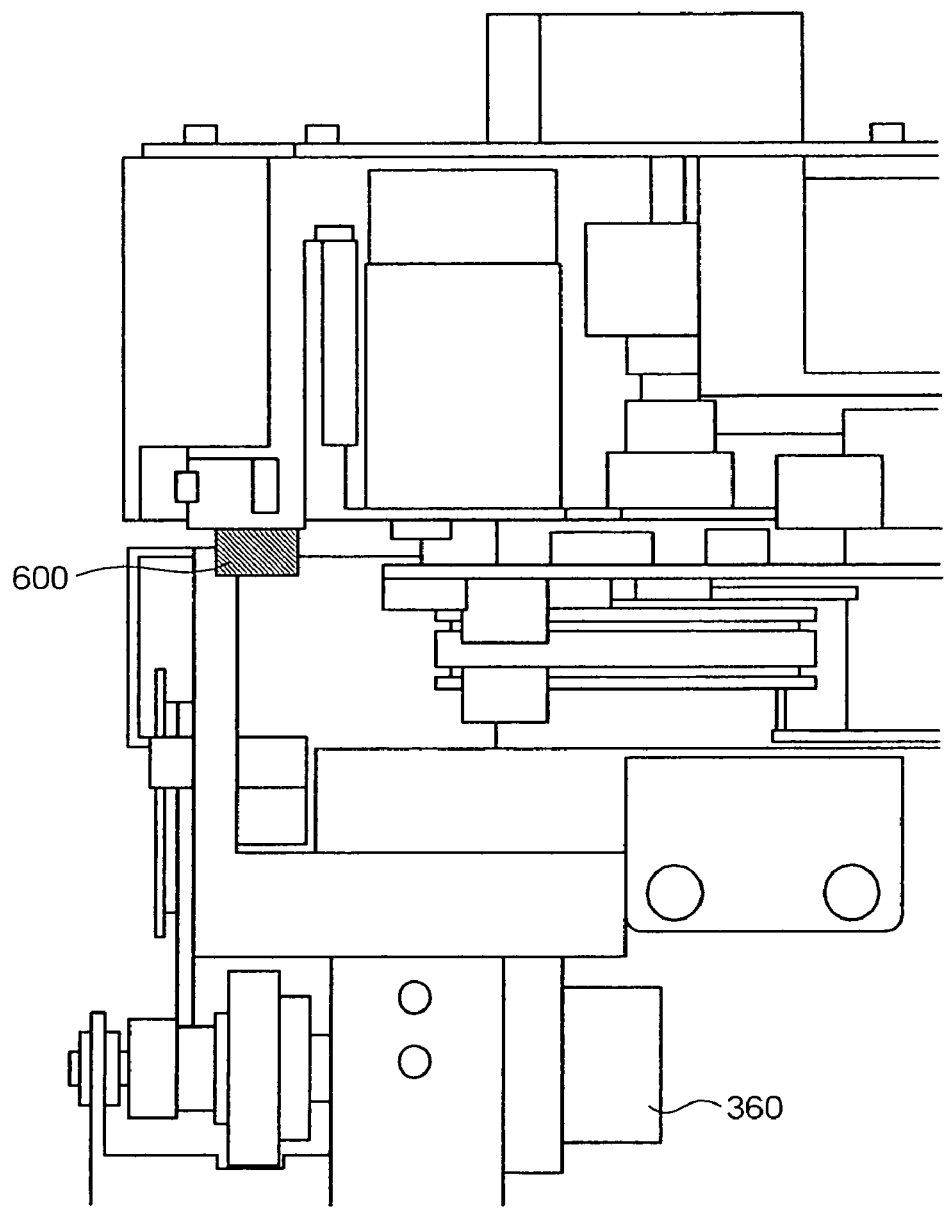
FIG. 28 is a schematic diagram of a lateral view of the first feeding mechanism shown in FIG. 27.

FIG. 27 is a schematic diagram of a top view of the X-axis mechanical unit base portion 545 when the inclination angle is 20 degrees. FIG. 28 is a schematic diagram of a lateral view of the X-axis mechanical unit base portion 545 when the inclination angle is 20 degrees. In other words, as shown in FIGS. 27 and 28, when the first feeding mechanism 300 is turned to an angle of 20 degrees and moves for a predetermined distance (greater than or equal to 110 mm) in the X direction, the stopper member 800 (shown in FIG. 5) that is arranged on the X-axis mechanical unit base portion 545 hits the edge surface of the stopper block member 546.

Figure 29:
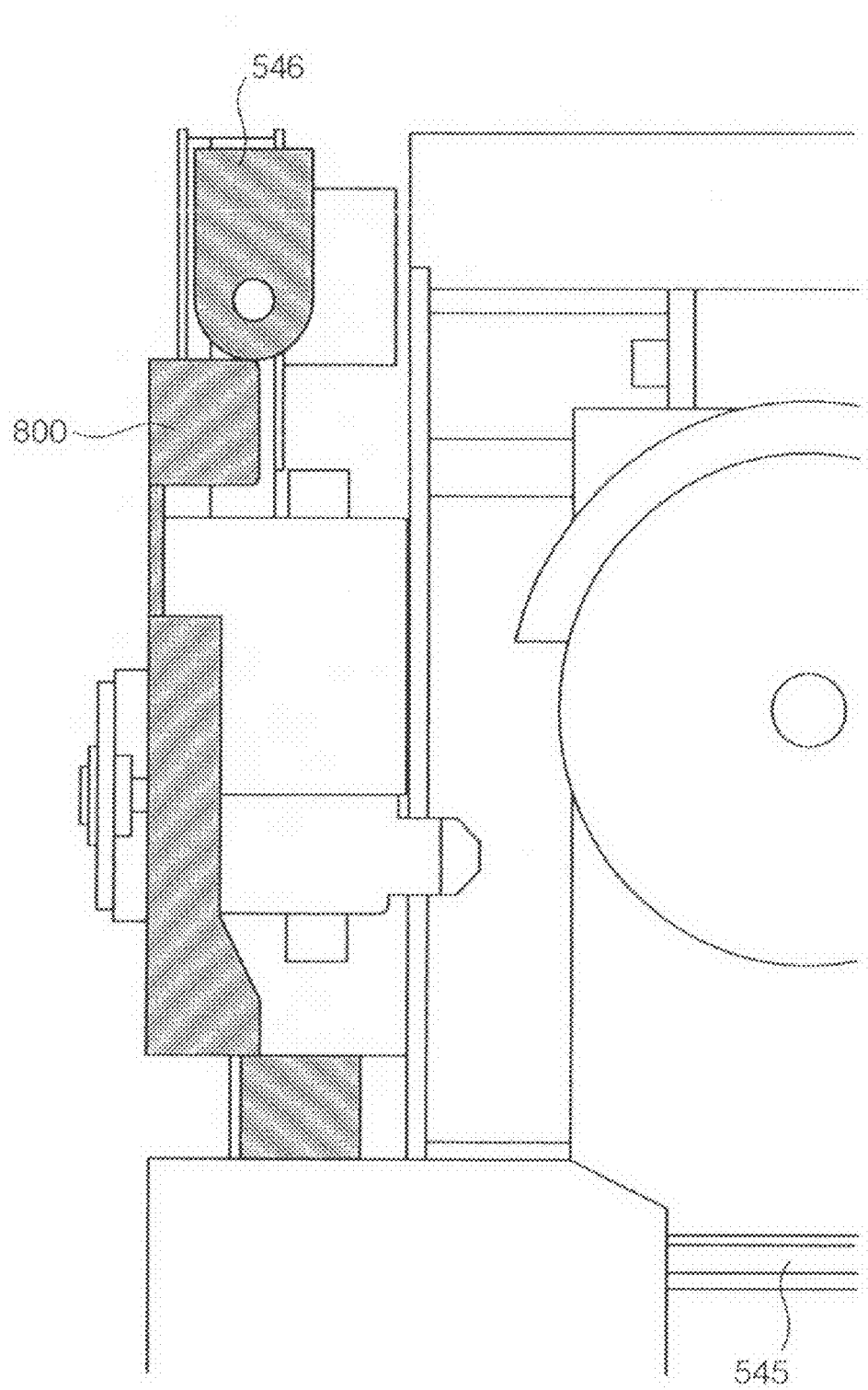
FIG. 29 is a schematic diagram of the first feeding mechanism shown in FIG. 5 when the inclination angle is 0 degree.
Figure 30:
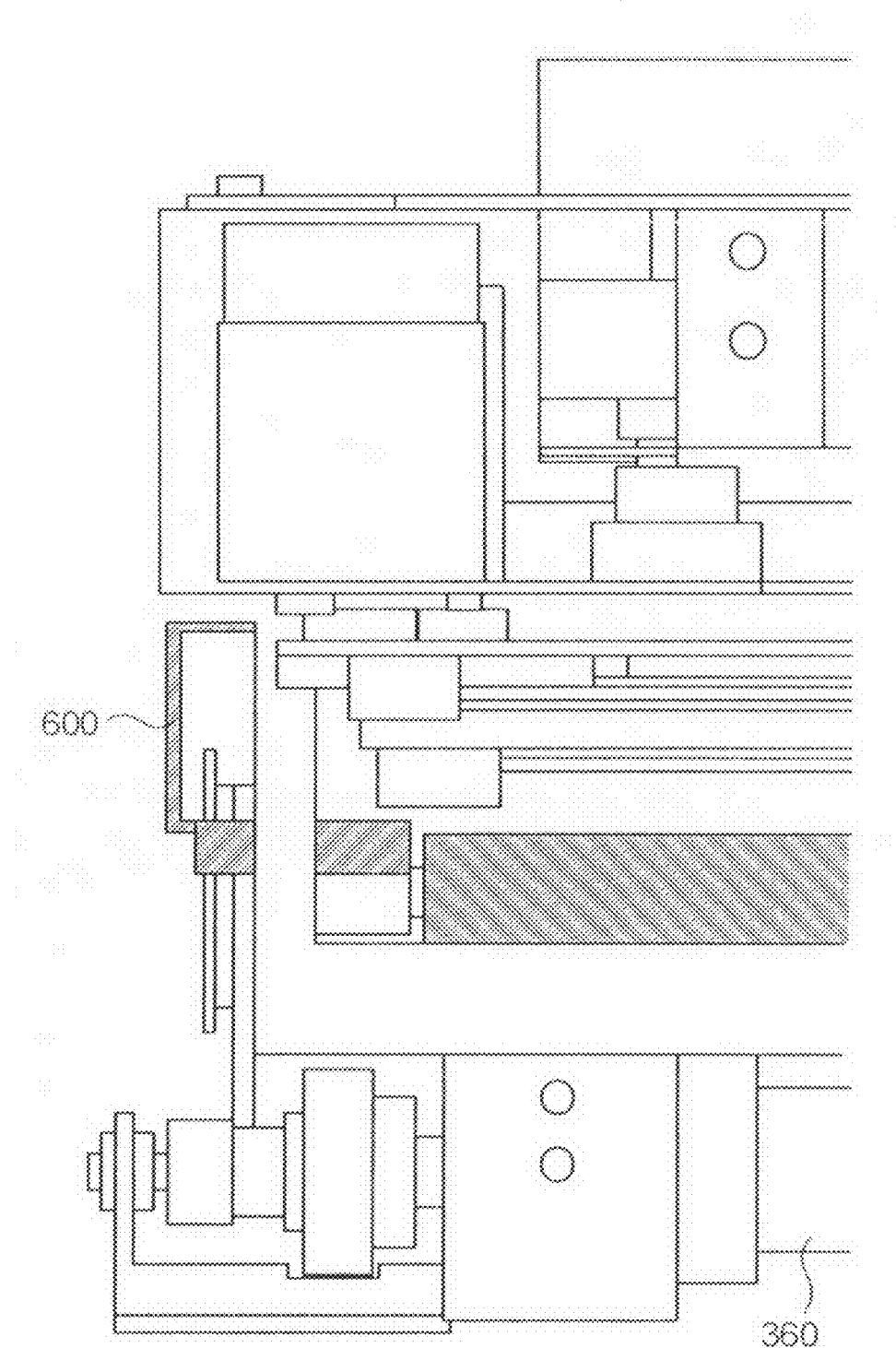
FIG. 30 is a schematic diagram of a lateral view of the first feeding mechanism shown in FIG. 29.
Figure 31:
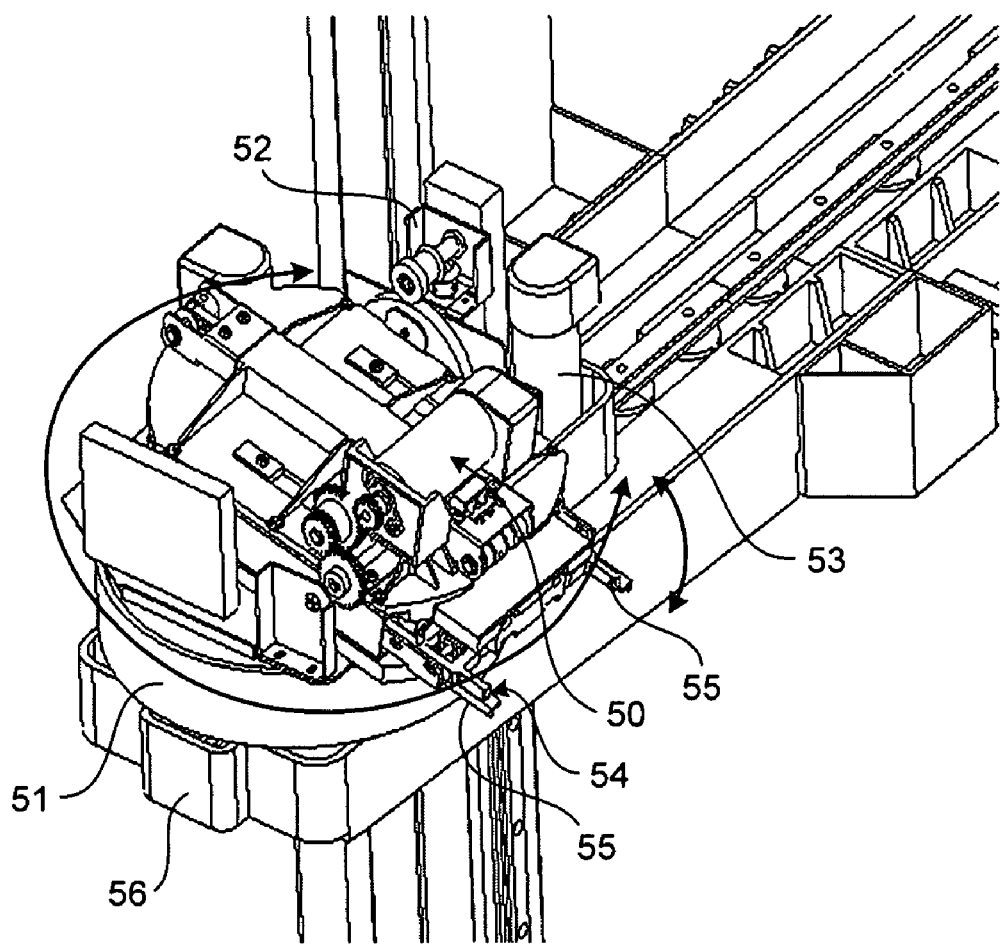
FIG. 31 is a perspective view of a commonly used feeding mechanism.

FIG. 29 is a schematic diagram of a top view of the X-axis mechanical unit base portion 545 when the inclination angle is 0 degree. FIG. 30 is a schematic diagram of a lateral view of the X-axis mechanical unit base portion 545 when the inclination angle is 0 degree. In other words, as shown in FIGS. 29 and 30, when the first feeding mechanism 300 is turned to an angle of 0 degree and moves for a predetermined distance (greater than or equal to 110 mm) in the X direction, the stopper member 600 (shown in FIG. 5) that is arranged on the X-axis mechanical unit base portion 545 hits the inner edge surface of the X-axis mechanical unit base portion 545.

In the library device 100 according to the present invention, the stopper members 600 to 900 which are located at the predetermined positions on the first feeding mechanism 300 prevent the movement of the first feeding mechanism 300 in the X direction (the direction towards the housing cabinets 220) if the first feeding mechanism 300 is overdriven. Thus, the stop precision at the multiple movable stop positions can be enhanced. Even if the direction (the inclination angle) of the first feeding mechanism 300 which is rotated by the swivel mechanical unit 320 is inclined at any angular position within the range of 180 degrees (from 90 degrees to 0 degree to −90 degrees), the stopper members 600 to 900 reliably stop the movement of the first feeding mechanism 300 according to each inclination angle.

The present invention in its broader aspects is not limited to the specific details and representative embodiments shown and described herein. Accordingly, various modifications may be made without departing from the spirit or scope of the general inventive concept as defined by the appended claims and their equivalents.

For example, the library device 100, which includes the first feeding mechanism 300 and the second feeding mechanism 400, is explained in the embodiment. However, even in a library device such as the commonly used library device that includes a single feeding mechanism, a structure can be used that includes multiple stopper members similar to the stopper members explained in present embodiment. Thus, the stop precision of the feeding mechanism can be enhanced.

As described above, according to one aspect of the present invention, during a movement of a feeding mechanism, a stop precision at a plurality of movable stop positions can be enhanced. Further, even if any failure occurs in the stop positions, a movement stopping unit can reliably stop the feeding mechanism at a predetermined position. Thus, even if the feeding mechanism is overdriven due to a breakdown etc., the feeding mechanism does not come in contact with a recording medium (a magnetic tape medium) and damage to the recording medium can be reliably prevented.

Furthermore, according to another aspect of the present invention, the stop precision at the movable stop positions can be enhanced and the movement of the feeding mechanism can be stopped according to an inclination angle of the feeding mechanism.

Moreover, according to still another aspect of the present invention, the stop precision at the movable stop positions can be enhanced and the movement of the feeding mechanism can be stopped according to a movement stroke of the feeding mechanism.

Furthermore, according to still another aspect of the present invention, the stop precision at the movable stop positions can be enhanced and the movement of the feeding mechanism can be stopped according to the inclination angle of the feeding mechanism.

Moreover, according to still another aspect of the present invention, a first and a second movement stopping units can reliably stop the movement of the feeding mechanism according to the inclination angle of greater than or equal to 0 degree or the inclination angle of greater than or equal to 90 degrees. Thus, even if the feeding mechanism is overdriven, the feeding mechanism does not come in contact with the recording medium (a magnetic tape cartridge) and damage to the recording medium can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A library device comprising:
    a housing cabinet that houses a plurality of recording media in a plurality of cells;
    a recording/reproducing device that performs recording/reproduction of data on a recording medium;
    a feeding mechanism that feeds the recording medium to a predetermined position of the housing cabinet, the feeding mechanism including a first feeding mechanism and a second feeding mechanism, the second feeding mechanism operating during non-operation of the first feeding mechanism;
    a movement control unit that performs a control of moving the feeding mechanism towards the housing cabinet;
    a swivel mechanical unit that swivels an inclination angle of the feeding mechanism to a predetermined angle along with an operation by the movement control unit; and
    a movement stopping unit that stops a movement of the feeding mechanism toward the housing cabinet by the movement control unit when the feeding mechanism is inclined by the swivel mechanical unit, wherein
    the movement stopping unit stops the movement of the feeding mechanism based on the inclination angle of the feeding mechanism.

2. The library device according to claim 1, wherein the movement stopping unit stops the movement of the feeding mechanism when the inclination angle of the feeding mechanism is different from a preset inclination angle.

3. The library device according to claim 1, wherein the movement stopping unit stops the movement of the feeding mechanism based on a movement stroke of the feeding mechanism by the movement control unit.

4. The library device according to claim 1, wherein the movement stopping unit has a function of stopping the movement of the feeding mechanism by a collision of a touching portion arranged at a predetermined position on the feeding mechanism with a movement stopping portion arranged on the movement stopping unit, according to a movement stroke direction of the feeding mechanism by the movement control unit and a movement rotation direction of the feeding mechanism by the swivel mechanical unit, respectively.

5. The library device according to claim 1, wherein the movement stopping unit includes
    a first movement stopping unit that functions to stop the movement of the feeding mechanism when the feeding mechanism is inclined at an angle equal to or larger than 0 degree by the swivel mechanical unit, and
    a second movement stopping unit that functions to stop the movement of the feeding mechanism when the feeding mechanism is inclined at the angle of 90 degrees by the swivel mechanical unit.

6. A library device comprising:
    a housing cabinet that houses a plurality of recording media in a plurality of cells;
    a recording/reproducing device that performs recording/reproduction of data on a recording medium;
    a feeding mechanism that feeds the recording medium to a predetermined position of the housing cabinet;
    a movement control unit that performs a control of moving the feeding mechanism towards the housing cabinet;
    a swivel mechanical unit that swivels an inclination angle of the feeding mechanism to a predetermined angle along with an operation by the movement control unit; and
    a movement stopping unit that stops a movement of the feeding mechanism toward the housing cabinet by the movement control unit when the feeding mechanism is inclined by the swivel mechanical unit, wherein
    the movement stopping unit stops the movement of the feeding mechanism based on the inclination angle of the feeding mechanism.

* * * * *